United States Patent
Li et al.

(10) Patent No.: US 11,140,676 B2
(45) Date of Patent: Oct. 5, 2021

(54) DATA TRANSMISSION METHOD, TERMINAL DEVICE, AND ACCESS NETWORK DEVICE

(71) Applicant: Huawei Technologies Co., Ltd., Shenzhen (CN)

(72) Inventors: Chenwan Li, Beijing (CN); Baokun Shan, Beijing (CN); Yinghui Yu, Beijing (CN); Yan Wang, Beijing (CN); Odile Rollinger, Cambridge (GB); Stuart Geary, Cambridge (GB); Zhenglei Huang, Beijing (CN); Hong Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 16/674,663

(22) Filed: Nov. 5, 2019

(65) Prior Publication Data

US 2020/0068547 A1 Feb. 27, 2020

Related U.S. Application Data

(63) Continuation of application No. PCT/CN2017/093440, filed on Jul. 18, 2017.

(30) Foreign Application Priority Data

May 5, 2017 (WO) ................ PCT/CN2017/083332

(51) Int. Cl.
*H04W 72/04* (2009.01)
*H04W 76/18* (2018.01)
(Continued)

(52) U.S. Cl.
CPC ......... *H04W 72/044* (2013.01); *H04L 9/0891* (2013.01); *H04W 72/048* (2013.01);
(Continued)

(58) Field of Classification Search
CPC . H04W 74/085; H04W 74/04; H04W 84/045; H04W 74/0833; H04W 88/02;
(Continued)

(56) References Cited

U.S. PATENT DOCUMENTS

| 2012/0172063 | A1* | 7/2012 | Lee ..................... H04W 74/006 455/458 |
| 2013/0077484 | A1 | 3/2013 | Zhao et al. |

(Continued)

FOREIGN PATENT DOCUMENTS

| CN | 102223715 A | 10/2011 |
| CN | 102333293 A | 1/2012 |

(Continued)

OTHER PUBLICATIONS

"Discussion on control plane based solution of data over NAS for NB-IOT," 3GPP TSG RAN WG2 Meeting #92, R2-156349, Anaheim, USA, Total 5 pages, 3rd Generation Partnership Project, Valbonne, France (Nov. 16-20, 2015).

(Continued)

*Primary Examiner* — Jung Liu
(74) *Attorney, Agent, or Firm* — Leydig, Voit & Mayer, Ltd.

(57) ABSTRACT

This application provides a data transmission method. The method includes: sending, by a terminal device, a first indication to an access network device, wherein the first indication is used to indicate early data transmission; and performing, by the terminal device, the early data transmission between the terminal device and the access network device.

17 Claims, 10 Drawing Sheets

(51) Int. Cl.
*H04L 9/08* (2006.01)
*H04W 74/00* (2009.01)
*H04L 29/08* (2006.01)
*H04W 12/03* (2021.01)

(52) U.S. Cl.
CPC ......... *H04W 74/004* (2013.01); *H04W 76/18* (2018.02); *H04L 67/12* (2013.01); *H04W 12/03* (2021.01)

(58) Field of Classification Search
CPC . H04W 4/70; H04W 47/722; H04W 72/0413; H04W 72/0446; H04W 4/005; H04W 28/06; H04L 47/722
See application file for complete search history.

(56) References Cited

U.S. PATENT DOCUMENTS

| | | | | |
|---|---|---|---|---|
| 2015/0181461 | A1* | 6/2015 | Kim | H04W 28/0289 370/236 |
| 2015/0271093 | A1* | 9/2015 | Cui | H04W 28/06 370/329 |
| 2018/0324854 | A1* | 11/2018 | Phuyal | H04W 74/085 |
| 2019/0141515 | A1* | 5/2019 | Kim | H04W 76/28 |
| 2019/0174554 | A1* | 6/2019 | Deenoo | H04L 5/0098 |
| 2020/0037345 | A1* | 1/2020 | Ryoo | H04W 76/27 |
| 2020/0137776 | A1* | 4/2020 | Lee | H04W 48/14 |

FOREIGN PATENT DOCUMENTS

| | | |
|---|---|---|
| CN | 102387495 A | 3/2012 |
| CN | 102457825 A | 5/2012 |
| CN | 102638900 A | 8/2012 |
| CN | 104144524 A | 11/2014 |
| CN | 104754759 A | 7/2015 |
| CN | 104904137 A | 9/2015 |
| EP | 3620021 A1 | 3/2020 |
| JP | 2013529402 A | 7/2013 |
| JP | 2016540441 A | 12/2016 |
| JP | 2018517337 A | 6/2018 |
| JP | 2018518117 A | 7/2018 |
| KR | 20140133232 A | 11/2014 |
| WO | 2013010486 A1 | 1/2013 |
| WO | 2014181178 A1 | 11/2014 |
| WO | 2016172521 A1 | 10/2016 |
| WO | 2016204985 A1 | 12/2016 |

OTHER PUBLICATIONS

"Early data transmission for MTC," 3GPP TSG RAN #88bis, Spokane, US, R1-1705197, XP051250903, pp. 1-8, 3rd Generation Partnership Project, Valbonne, France (Apr. 3-7, 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"Discussion on NPRACH enhancement," 3GPP TSG RAN WG1 Meeting #88bis, Spokane, USA, R1-1705311, XP051251866, pp. 1-4, 3rd Generation Partnership Project, Valbonne, France (Apr. 3-7, 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0, pp. 1-330, 3rd Generation Partnership Project, Valbonne, France (Mar. 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, V14.1.0, pp. 1-318, 3rd Generation Partnership Project, Valbonne, France (Dec. 2016).

"3rd Generation Partnership Project; Technical Specification Group Radio Access Network; Evolved Universal Terrestrial Radio Access Network (E-UTRAN); S1 Application Protocol (S1AP)(Release 14)," 3GPP TS 36.413 V14.2.0, pp. 1-342, 3rd Generation Partnership Project, Valbonne, France (Mar. 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.2.1, pp. 1-106, 3rd Generation Partnership Project, Valbonne, France (Mar. 2017).

EP/17908302.7, Office Action, dated Apr. 28, 2021.

"Data transmission during random access procedure in NB-IoT," 3GPP TSG RAN WG1 Meeting #88bis, R1-1704853, Spokane, USA, Total 6 pages, 3rd Generation Partnership Project, Valbonne, France (Apr. 3-7, 2017).

"Transmission of data during random access procedure," 3GPP TSG RAN WG1 Meeting #88bis, R1-1705121, Spokane, USA, Total 2 pages, 3rd Generation Partnership Project, Valbonne, France (Apr. 3-7, 2017).

* cited by examiner

| R | TAC | | Oct 1 |
|---|---|---|---|
| | TAC | UL grant #1 | Oct 2 |
| | UL grant #1 | | Oct 3 |
| | UL grant #1 | | Oct 4 |
| | TC-RNTI | | Oct 5 |
| | TC-RNTI | | Oct 6 |
| | UL grant #2 | | Oct 7 |
| | UL grant #2 | | Oct 8 |

FIG. 11

| R | TAC | | Oct 1 |
|---|---|---|---|
| | TAC | UL grant #1 | Oct 2 |
| | UL grant #1 | | Oct 3 |
| | UL grant #1 | | Oct 4 |
| | UL grant #2 | | Oct 5 |
| | UL grant #2 | | Oct 6 |
| | TC-RNTI | | Oct 5 |
| | TC-RNTI | | Oct 6 |

FIG. 12

| R | TAC | | Oct 1 |
|---|---|---|---|
| | TAC | UL grant | Oct 2 |
| | UL grant | | Oct 3 |
| | UL grant | | Oct 4 |
| | UL grant | | Oct 5 |
| | UL grant | | Oct 6 |
| | TC-RNTI | | Oct 5 |
| | TC-RNTI | | Oct 6 |

FIG. 13

| | | | | | | | |
|---|---|---|---|---|---|---|---|
| R #1 | TAC | | | | | | Oct 1 |
| TAC | | | | UL grant #1 | | | Oct 2 |
| UL grant #1 | | | | | | | Oct 3 |
| UL grant #1 | | R #2 | | | | | Oct 4 |
| TC-RNTI | | | | | | | Oct 5 |
| TC-RNTI | | | | | | | Oct 6 |
| UL grant #2 | | | | | | | Oct 7 |
| UL grant #2 | | | | | | | Oct 8 |

DATA TRANSMISSION METHOD, TERMINAL DEVICE, AND ACCESS NETWORK DEVICE

CROSS-REFERENCE TO RELATED APPLICATIONS

This application is a continuation of International Application No. PCT/CN2017/093440, filed on Jul. 18, 2017, which claims priority to International Patent Application No. PCT/CN2017/083332, filed on May 5, 2017. The disclosures of the aforementioned applications are hereby incorporated by reference in their entireties.

TECHNICAL FIELD

This application relates to the internet of things field, and more specifically, to a data transmission method, a terminal device, and an access network device.

BACKGROUND

With rapid development of wireless communications, people are no longer satisfied with application of only human-to-human communication. Therefore, an internet of things (Internet of Things, or IoT) technology emerges, and a market demand for the internet of things technology increases rapidly. Internet of things (IoT) is also referred to as machine-to-machine (M2M) communication or machine type communication (MTC). An MTC service has some special service characteristics, for example, a small data transmission volume, a distinct service periodicity characteristic, low power consumption, and a large quantity of terminals.

A typical cellular internet of things system is a narrowband internet of things (Narrowband IoT, or NB-IoT). In the prior art, uplink/downlink data transmission can be at least performed only after an RRC connection is established, causing problems of excessively large signaling overheads and high power consumption. This is quite disadvantageous to service transmission in an NB-IoT scenario. Therefore, a new data transmission method applicable to the service transmission in the NB-IoT scenario is required.

SUMMARY

This application provides a data transmission method, a terminal device, and an access network device, to transmit data before a radio resource control (RRC) connection is established, reduce signaling overheads required for establishing a bearer for data transmission, and reduce power consumption of a device.

According to a first aspect, this application relates to a data transmission method. The method includes: sending, by a terminal device, a first indication to an access network device, where the first indication is used to indicate that data needs to be transmitted before a radio resource control RRC connection is established; and transmitting the data between the terminal device and the access network device before the RRC connection is established.

Therefore, according to the method in this embodiment of this application, the data (including uplink data and downlink data) can be transmitted based on the first indication before the RRC is established, so that signaling overheads required for establishing a bearer for data transmission can be reduced, and power consumption of a device can be reduced.

In a possible implementation, when the first indication is a random access preamble, the sending, by a terminal device, a first indication to an access network device includes: sending, by the terminal device, a first random access preamble to the access network device.

Therefore, the access network device can determine, based on the first random access preamble, that the data needs to be transmitted before the RRC connection is established. For example, the access network device can determine that the terminal device needs to perform early uplink data transmission, or can determine that the terminal device needs to perform early downlink data transmission.

In a possible implementation, the sending, by a terminal device, a first indication to an access network device includes: sending, by the terminal, a random access request message by using a first time-frequency-code resource or a second time-frequency-code resource, where the first time-frequency-code resource may be used to indicate early uplink data transmission, and the second time-frequency-code resource may be used to indicate early downlink data transmission.

In a possible implementation, the sending, by a terminal device, a first indication to an access network device includes: sending, by the terminal device, a random access preamble to the access network device on a first random access resource.

Therefore, the access network device can determine, based on the first random access resource, that the data needs to be transmitted before the RRC connection is established. For example, the access network device can determine that the terminal device needs to perform early uplink data transmission, or can determine that the terminal device needs to perform early downlink data transmission.

In a possible implementation, the sending, by a terminal device, a first indication to an access network device includes: sending, by the terminal device, a message 3 that includes the first indication to the access network device, where the message 3 is any one of the following messages: an RRC connection request message, an RRC connection reestablishment request message, and an RRC connection resume request message.

In a possible implementation, that the first indication is used to indicate that data needs to be transmitted before a radio resource control RRC connection is established includes:

the first indication is used to indicate that downlink data needs to be transmitted before the RRC connection is established.

In a possible implementation, the transmitting the data between the terminal device and the access network device before the RRC connection is established includes:

transmitting a non-access-stratum protocol data unit (NAS PDU) between the terminal device and the access network device before the RRC connection is established; or transmitting the data between the terminal device and the access network device by using a data radio bearer (DRB) before the RRC connection is established.

In a possible implementation, the method further includes: receiving, by the terminal device, a release message sent by the access network device, where the release message is a radio resource control RRC connection setup message, an RRC connection resume message, an RRC connection reestablishment complete message, an RRC connection reject message, or an RRC connection release message, and the release message is used to release the terminal device to an idle mode.

Optionally, the release message may carry the data that needs to be transmitted.

Further, if the release message is the RRC connection setup message, an RRC connection reestablishment message, or RRC connection resume message, the message may include related information in RRC connection release message, to release a connection of the terminal device. The message may specifically include a release cause, a redirection indication, and the like.

If the release message is the RRC connection reject message, the message may also carry indication information, for example, a cause value, to indicate that the terminal device is to be released to the idle mode.

If the release message is the RRC connection release message and carries identifier information of the terminal device, a media access control element (MAC CE) carrying the identifier may be alternatively added to an RRC message, to directly release the terminal device to the idle mode.

When an MME has no downlink data transmission, the terminal device can be released in advance by using the RRC connection setup message, the RRC connection reestablishment message, RRC connection resume message, or the RRC connection reject message. Compared with a release procedure in the prior art, this can reduce signaling overheads, and can reduce power consumption of the terminal device.

According to a second aspect, a data transmission method is provided, including: receiving, by an access network device, a first indication sent by a terminal device, where the first indication is used to indicate that data needs to be transmitted before a radio resource control RRC connection is established; and transmitting the data between the access network device and the terminal device before the RRC connection is established.

Therefore, according to the method in this embodiment of this application, the data (including uplink data and downlink data) can be transmitted based on the first indication before the RRC is established, so that signaling overheads required for establishing a bearer for data transmission can be reduced, and power consumption of a device can be reduced.

In a possible implementation, when the first indication is a random access preamble, the receiving, by an access network device, a first indication sent by a terminal device includes: receiving, by the access network device, a first random access preamble sent by the terminal device.

Therefore, the access network device can determine, based on the first random access preamble, that the data needs to be transmitted before the RRC connection is established. For example, the access network device can determine that the terminal device needs to perform early uplink data transmission, or can determine that the terminal device needs to perform early downlink data transmission.

In a possible implementation, the receiving, by an access network device, a first indication sent by a terminal device includes: receiving, by the access network device, a random access preamble sent by the terminal device on a first random access resource.

Therefore, the access network device can determine, based on the first random access resource, that the data needs to be transmitted before the RRC connection is established. For example, the access network device can determine that the terminal device needs to perform early uplink data transmission, or can determine that the terminal device needs to perform early downlink data transmission.

In a possible implementation, the receiving, by an access network device, a first indication sent by a terminal device includes: receiving, by the access network device, a message 3 that includes the first indication and that is sent by the terminal device, where the message 3 is any one of the following messages:

an RRC connection request message, an RRC connection reestablishment request message, and an RRC connection resume request message.

In a possible implementation, that the first indication is used to indicate that data needs to be transmitted before a radio resource control RRC connection is established includes: the first indication is used to indicate that downlink data needs to be transmitted before the RRC connection is established.

In a possible implementation, the transmitting the data between the access network device and the terminal device before the RRC connection is established includes: transmitting a non-access-stratum protocol data unit NAS PDU between the access network device and the terminal device before the RRC connection is established; or transmitting the data between the access network device and the terminal device by using a data radio bearer DRB before the RRC connection is established.

In a possible implementation, the method further includes: sending, by the access network device, the NAS PDU to a core network device.

In a possible implementation, the method further includes: sending, by the access network device, a release message to the terminal device, where the release message is a radio resource control RRC connection setup message, an RRC connection resume message, an RRC connection reestablishment complete message, an RRC connection reject message, or an RRC connection release message, and the release message is used to release the terminal device to an idle mode.

Optionally, the release message may carry the data that needs to be transmitted.

Further, if the release message is the RRC connection setup message, an RRC connection reestablishment message, or RRC connection resume message, the message may include related information in RRC connection release message, to release a connection of the terminal device. The message may specifically include a release cause, a redirection indication, and the like.

If the release message is the RRC connection reject message, the message may also carry indication information, for example, a cause value, to indicate that the terminal device to the idle mode.

If the release message is the RRC connection release message and carries identifier information of the user equipment, a MAC CE carrying the identifier may be alternatively added to an RRC message, to directly release the terminal device to the idle mode.

When an MME has no downlink data transmission, the terminal device can be released in advance by using the RRC connection setup message, the RRC connection reestablishment message, RRC connection resume message, or the RRC connection reject message. Compared with a release procedure in the prior art, this can reduce signaling overheads, and can reduce power consumption of the terminal device.

According to a third aspect, a terminal device is provided, configured to perform the method in any one of the first aspect or the possible implementations of the first aspect. Specifically, the terminal device includes units configured to perform the method in any one of the first aspect or the possible implementations of the first aspect.

According to a fourth aspect, an access network device is provided, configured to perform the method in any one of the second aspect or the possible implementations of the second aspect. Specifically, the access network device includes units configured to perform the method in any one of the second aspect or the possible implementations of the second aspect.

According to a fifth aspect, a terminal device is provided. The terminal device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor is enabled to perform the method in any one of the first aspect or the possible implementations of the first aspect.

According to a sixth aspect, an access network device is provided. The access network device includes a receiver, a transmitter, a processor, a memory, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor is enabled to perform the method in any one of the second aspect or the possible implementations of the second aspect.

According to a seventh aspect, this application provides a computer readable medium, configured to store a computer program. The computer program includes an instruction used to perform the method in any one of the first aspect or the possible implementations of the first aspect.

According to an eighth aspect, a computer readable medium is provided, configured to store a computer program. The computer program includes an instruction used to perform the method in any one of the second aspect or the possible implementations of the second aspect.

According to a ninth aspect, a data transmission method is provided, including: sending, by a terminal device, a first indication to an access network device, where the first indication is used to indicate that the terminal device is to transmit data based on $1^{st}$ radio resource control RRC signaling to be sent by the terminal device to the access network device, and/or the first indication is used to indicate that the access network device is to transmit data based on $1^{st}$ radio resource control RRC signaling to be sent by the access network device to the terminal device; and transmitting the data between the terminal device and the access network device based on the $1^{st}$ RRC signaling.

Specifically, the first indication is used to instruct to: add the data to first signaling transmitted between the terminal device and the access network device, transmit the data while transmitting the first signaling, or transmit the data right after transmitting the first signaling. The first signaling is the $1^{st}$ RRC signaling between the terminal device and the access network device in a random access process. To be specific, the first indication is used to indicate that the terminal device is to transmit uplink data based on the $1^{st}$ RRC signaling between the terminal device and the access network device, and/or the first indication is used to indicate that the access network device is to transmit downlink data based on the $1^{st}$ RRC signaling between the access network device and the terminal device.

Therefore, according to the method in this embodiment of this application, uplink data and/or downlink data can be transmitted based on the $1^{st}$ RRC signaling between the terminal device and the access network device, without a need of establishing an RRC connection. This can reduce signaling overheads required for establishing a bearer for data transmission, and can reduce power consumption of a device.

In a possible implementation, the transmitting the data between the terminal device and the access network device based on the $1^{st}$ RRC signaling includes:

transmitting the data between the terminal device and the access network device by adding the data to the $1^{st}$ RRC signaling.

In a possible implementation, the transmitting the data between the terminal device and the access network device includes:

transmitting the data between the terminal device and the access network device by using a non-access-stratum protocol data unit NAS PDU; or transmitting the data between the terminal device and the access network device by using a data radio bearer DRB.

Optionally, the data may be sent by using the DRB or an SRB0.

In this application, one transport block may be multiplex by the data and the $1^{st}$ RRC signaling, or the data and the $1^{st}$ RRC signaling may be separately transmitted as two transport blocks.

It should be noted that when the data and the $1^{st}$ RRC signaling are transmitted together, the $1^{st}$ RRC signaling may carry an identifier of the terminal device; or when the data and the $1^{st}$ RRC signaling are separately transmitted, the data may carry an identifier of the terminal device, or may be scrambled by using the identifier of the terminal device.

For example, the identifier of the terminal device may be a cell radio network temporary identifier (RNTI), a hash serving temporary mobile subscriber identity (hash S-TMSI), an S-TMSI, a truncated S-TMSI, an access random number, an international mobile subscriber identity (IMSI), an identifier of the terminal device carried in a MAC CE, or the like. The identifier of the terminal device is not specifically limited in this application.

Further, if the data and the $1^{st}$ RRC signaling may be respectively transmitted as two transport blocks, a NAS PDU carrying the data may be sent by using an SRB1 bis or the SRB0; or the $1^{st}$ RRC signaling is sent by using the SRB0, and the data is sent by using the DRB.

In a possible implementation, the $1^{st}$ RRC signaling is a message 3 or a message 4.

In a possible implementation, the message 3 is any one of the following messages:

an RRC connection request message, an RRC connection reestablishment request message, and an RRC connection resume request message; and/or the message 4 is any one of the following messages:

a contention resolution message, an RRC connection setup message, an RRC connection reestablishment message, and an RRC connection resume message.

In a possible implementation, when the first indication is a random access preamble, the sending, by a terminal device, a first indication to an access network device includes:

sending, by the terminal device, a first random access preamble to the access network device.

In a possible implementation, the sending, by a terminal device, a first indication to an access network device includes:

sending, by the terminal device, a random access preamble to the access network device on a first random access resource.

In a possible implementation, before the transmitting the data between the terminal device and the access network device based on the $1^{st}$ RRC signaling, the method further includes:

receiving, by the terminal device, a system message, where the system message includes data volume information, and the data volume information is used to indicate a maximum volume of data that can be transmitted by the terminal device based on the $1^{st}$ RRC signaling; and the transmitting the data between the terminal device and the access network device based on the $1^{st}$ RRC signaling includes:

when the terminal device determines that a data volume of the data is less than or equal to the maximum data volume, transmitting, by the terminal device, the data to the access network device based on the $1^{st}$ RRC signaling.

In a possible implementation, the method may further include:

receiving, by the terminal device, a candidate message sent by the access network device, where the candidate message includes indication information, the candidate message is an RRC connection setup message, an RRC connection resume message, an RRC connection reestablishment complete message, an RRC connection reject message, or an RRC connection release message, and the indication information is used to instruct the terminal device to remain in an idle mode.

Optionally, the candidate message may be a message 4.

In this way, when there is no downlink data transmission, the terminal device can be released in advance according to the indication information in the message 4. Compared with a release procedure in the prior art, this can reduce signaling overheads, and can reduce power consumption of the terminal device.

According to a tenth aspect, a data transmission method is provided, including:

receiving, by an access network device, a first indication sent by a terminal device, where the first indication is used to indicate that the terminal device is to transmit data based on $1^{st}$ radio resource control RRC signaling to be sent by the terminal device to the access network device, and/or the first indication is used to indicate that the access network device is to transmit data based on $1^{st}$ radio resource control RRC signaling to be sent by the access network device to the terminal device; and transmitting the data between the access network device and the terminal device based on the $1^{st}$ RRC signaling.

Therefore, according to the method in this embodiment of this application, uplink data and/or downlink data can be transmitted based on the $1^{st}$ RRC signaling between the terminal device and the access network device, without a need of establishing an RRC connection. This can reduce signaling overheads required for establishing a bearer for data transmission, and can reduce power consumption of a device.

In a possible implementation, the transmitting the data between the access network device and the terminal device based on the $1^{st}$ RRC signaling includes:

transmitting the data between the access network device and the terminal device by adding the data to the $1^{st}$ RRC signaling.

In a possible implementation, the transmitting the data between the access network device and the terminal device includes:

transmitting the data between the access network device and the terminal device by using a non-access-stratum protocol data unit NAS PDU; or transmitting the data between the access network device and the terminal device by using a data radio bearer DRB.

In a possible implementation, the $1^{st}$ RRC signaling is a message 3 or a message 4.

In a possible implementation, the message 3 is any one of the following messages:

an RRC connection request message, an RRC connection reestablishment request message, and an RRC connection resume request message; and/or the message 4 is any one of the following messages:

a contention resolution message, an RRC connection setup message, an RRC connection reestablishment message, and an RRC connection resume message.

In a possible implementation, when the first indication is a random access preamble, the receiving, by an access network device, a first indication sent by a terminal device includes:

receiving, by the access network device, a first random access preamble sent by the terminal device.

In a possible implementation, the receiving, by an access network device, a first indication sent by a terminal device includes:

receiving, by the access network device, a random access preamble sent by the terminal device on a first random access resource.

In a possible implementation, the method may further include:

sending, by the access network device, the NAS PDU to a core network device.

Optionally, the NAS PDU may be carried in a retrieve UE information message or an initial UE message.

In a possible implementation, before the transmitting the data between the access network device and the terminal device based on the $1^{st}$ RRC signaling, the method further includes: receiving, by the access network device, the NAS PDU sent by the core network device; and the transmitting the data between the access network device and the terminal device based on the $1^{st}$ RRC signaling includes: transmitting, by the access network device, the NAS PDU to the terminal device based on the $1^{st}$ RRC signaling.

Optionally, the $1^{st}$ RRC signaling is a UE information transfer message or a downlink NAS transport message.

Further, the NAS PDU includes indication information, and the indication information is used to instruct the access network device to instruct the terminal device to remain in an idle mode.

In a possible implementation, the method may further include:

sending, by the access network device, a candidate message to the terminal device, where the candidate message includes indication information, the candidate message is an RRC connection setup message, an RRC connection resume message, an RRC connection reestablishment complete message, an RRC connection reject message, or an RRC connection release message, and the indication information is used to instruct the terminal device to remain in an idle mode.

According to an eleventh aspect, a terminal device is provided, configured to perform the method in any one of the ninth aspect or the possible implementations of the ninth aspect. Specifically, the terminal device includes units configured to perform the method in any one of the ninth aspect or the possible implementations of the ninth aspect.

According to a twelfth aspect, an access network device is provided, configured to perform the method in any one of the tenth aspect or the possible implementations of the tenth aspect. Specifically, the access network device includes units configured to perform the method in any one of the tenth aspect or the possible implementations of the tenth aspect.

According to a thirteenth aspect, a terminal device is provided. The terminal device includes a memory, a processor, and a transceiver. The memory is configured to store program code. The processor is configured to execute the program code stored in the memory, to perform operations corresponding to the method in any one of the ninth aspect or the possible implementations of the ninth aspect.

According to a fourteenth aspect, an access network device is provided. The access network device includes a memory, a processor, and a transceiver. The memory is configured to store program code. The processor is configured to execute the program code stored in the memory, to perform operations corresponding to the method in any one of the tenth aspect or the possible implementations of the tenth aspect.

According to a fifteenth aspect, this application provides a computer readable medium, configured to store a computer program. The computer program includes an instruction used to perform the method in any one of the ninth aspect or the possible implementations of the ninth aspect.

According to a sixteenth aspect, a computer readable medium is provided, configured to store a computer program. The computer program includes an instruction used to perform the method in any one of the tenth aspect or the possible implementations of the tenth aspect.

BRIEF DESCRIPTION OF DRAWINGS

FIG. 11 is a schematic diagram of a format of a message 2;

FIG. 12 is a schematic diagram of another format of a message 2;

FIG. 13 is a schematic diagram of still another format of a message 2;

DESCRIPTION OF EMBODIMENTS

The following describes the technical solutions of this application with reference to the accompanying drawings.

It should be understood that the technical solutions of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), a new radio (New Radio Access Technology, or NR) system, and a 5G system.

It should be further understood that, in the embodiments of this application, a terminal device may also be referred to as a terminal or a user equipment (UE), and may include but is not limited to a terminal device applied to internet of things. For example, the terminal device may be a terminal device applied to NB-IoT (which may be referred to as an "NB-IoT terminal"), such as a smart metering device, a logistics tracking device, or an environment monitoring device. The terminal may further include but is not limited to a mobile station (MS), a mobile terminal, a mobile phone, a user equipment (UE), a handset, portable equipment, and the like. The terminal device may communicate with one or more core networks by using a radio access network (RAN). For example, the terminal device may be a mobile phone (or referred to as a "cellular" phone) or a computer having a wireless communications function. Alternatively, the terminal device may be a portable, pocket-sized, handheld, computer built-in, or in-vehicle mobile apparatus.

In the embodiments of this application, an access network device may also be referred to as a radio access network (RAN) device. For example, the access network device may be a base station, a base station controller, a radio network controller (RNC), or a transmit and receive point (TRP). The base station may be a base transceiver station (BTS) in GSM or CDMA, or may be a NodeB in WCDMA, or may be an evolved NodeB (eNB, or e-NodeB) in LTE, or may be a gNB in NR or 5G. This is not specifically limited in the embodiments of this application.

The embodiments of this application are further related to a core network (CN) device, mainly including a mobility management entity (MME) and a serving gateway (S-GW). The MME may have different names in different systems or in networks with different standards, and is collectively described as an MME in this application for ease of understanding. Correspondingly, the S-GW may have different names in different systems or in networks with different standards, and is collectively described as an S-GW in this application for ease of understanding.

Figure 1:
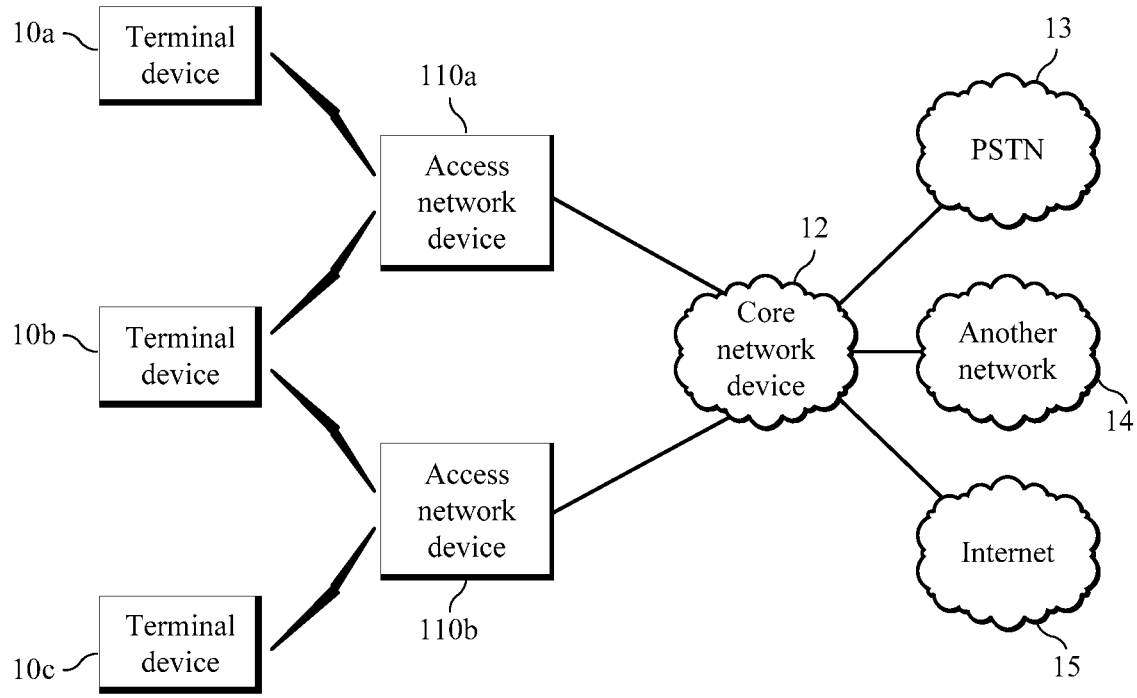
FIG. 1 is a schematic diagram of a communications system applicable to this application.

FIG. 1 is a schematic diagram of a communications system applicable to this application. In FIG. 1, a terminal device may communicate with a core network device by using one or more access network devices. For example, in FIG. 1, a terminal device 10a may communicate with a core network device 12 by using an access network device 110a, a terminal device 10b may communicate with the core network device 12 by using the access network device 110a or an access network device 110b, and a terminal device 10c may communicate with the core network device 12 by using the access network device 110b. Further, the terminal device may communicate with a public switched telephone network (PSTN) 13 or another network 14 or even an entire internet 15.

In the prior art, uplink/downlink data transmission can be performed at least after an RRC connection is established. In this case, data is transmitted relatively late, causing problems of excessively large signaling overheads and high power consumption. To resolve the problems, this application proposes a data transmission method, to implement early data transmission, so that power consumption and signaling overheads can be reduced.

Before the data transmission method in this application is described, related terms or concepts in this application are first described.

Early data transmission may be understood as uplink and/or downlink data transmission performed before an RRC connection establishment/resume/reestablishment complete message is received.

Early data transmission may be alternatively understood as uplink and/or downlink data transmission performed in a random access process.

Early data transmission may be alternatively understood as uplink and/or downlink data transmission performed by a terminal device by using $1^{st}$ RRC signaling between the terminal device and an access network device.

Early data transmission may be considered as a capability. If a terminal device supports the data transmission method, the terminal device supports the capability. If an access network device supports the terminal device in using the method, it indicates that the access network device supports the capability of early data transmission.

When sending a system message, an access network device may indicate whether the capability of early data transmission is supported. Before random access, a terminal device may determine, based on the received system message, whether the access network device supports the capability. If the access network device does not support the capability, a terminal device that supports the capability and that expects to perform transmission by using the capability may choose not to access the access network device.

For example, the system message may also indicate an upper limit or a threshold of a data volume of uplink data to be sent by the terminal device in a $1^{st}$ RRC signaling message, or an upper limit or a threshold of a data volume of a $1^{st}$ uplink RRC message and uplink data, or an upper limit or a threshold of a data volume, allowed to be transmitted, of uplink data other than a $1^{st}$ RRC signaling message, for example, 20 bytes. If the terminal device finds that a volume of to-be-sent uplink data exceeds an upper limit or a threshold of a volume of system-broadcast data, the terminal device may choose to perform access in a normal data transmission manner. If a volume of uplink data that needs to be sent by the terminal device is less than an upper limit or a threshold of the data volume, the terminal device may choose to send the data in a manner of early uplink data transmission.

The system message may be a SIB2, a SIB22, or another system message.

For example, a default threshold may be defined in a protocol, and the threshold may indicate an upper limit of a data volume of uplink data to be sent by the terminal device in a $1^{st}$ RRC signaling message, or an upper limit of a data volume of a $1^{st}$ uplink RRC message and uplink data, or an upper limit of a data volume, allowed to be transmitted, of uplink data other than a $1^{st}$ RRC signaling RRC message. If the terminal device finds that the data volume of the $1^{st}$ RRC signaling and the uplink data exceeds the threshold, the terminal device may choose to perform access in a normal manner. If a volume of uplink data that needs to be sent by the terminal device is less than the threshold, the terminal device may choose to send the data in a manner of early uplink data transmission.

For example, if the terminal device supports the capability of early data transmission, the terminal device may choose, based on a service type or a volume of data that needs to be sent, whether to send the data in a manner of early data transmission. If the terminal device chooses the manner of early data transmission, when resources allocated by the access network device are sufficient for data transmission, the terminal device transmits the data in a manner of uplink early uplink transmission. If data resources allocated by the access network device are insufficient for sending all the uplink data that needs to be sent by the terminal device, the terminal device may choose a normal data transmission procedure, that is, first establish an RRC connection and then send the data. For example, the data may be transmitted in a message 5 (for example, an RRC connection complete message or an RRC connection reestablishment complete message). Alternatively, the terminal device first sends partial data on a resource allocated by the access network device for a message 3, and then remaining data may be sent after an RRC connection is subsequently established.

It should be understood that, for signaling, messages, or the like that are described in the embodiments of this application and that are the same as or similar to those in an existing protocol or the prior art, reference may be made to the prior art. For brevity, content included in the signaling or messages is not described in detail based on specific functions and the like in the following.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, it can be understood that the terms "first" and "second" in this application are merely used for ease of description and understanding, and should not be construed as any limitation on the embodiments of this application.

Figure 2:
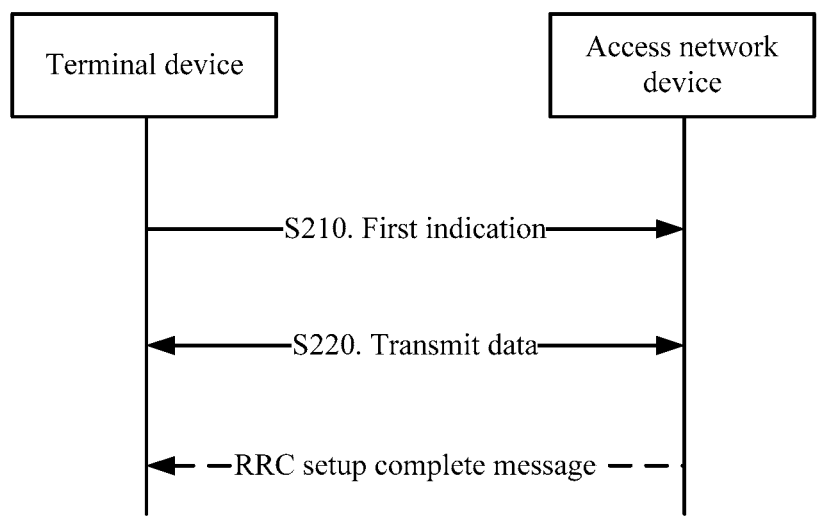
FIG. 2 is a schematic flowchart of a data transmission method according to an embodiment of this application.

The following describes in detail a data transmission method in this application with reference to FIG. 2. It should be understood that FIG. 2 shows detailed communication steps or operations of the method. However, these steps or operations are merely examples, and other operations or variations of various operations in FIG. 2 may be further performed in this embodiment of this application. In addition, the steps in FIG. 2 may be performed in a sequence different from that shown in FIG. 2, and not all operations in FIG. 2 may be performed.

FIG. 2 is a schematic flowchart of a data transmission method according to an embodiment of this application.

S210. A terminal device sends a first indication to an access network device. Correspondingly, the access network device receives the first indication.

Specifically, the first indication is used to indicate that data needs to be transmitted before a radio resource control RRC connection is established. Therefore, the access network device can determine, based on the first indication, that the data needs to be transmitted before the RRC connection is established. For example, the access network device can determine that the terminal device needs to perform early uplink data transmission, or can determine that the terminal device needs to perform early downlink data transmission.

It should be understood that early uplink data transmission means that uplink data needs to be transmitted before the radio resource control RRC connection is established, and early downlink data transmission means that downlink data needs to be transmitted before the radio resource control RRC connection is established.

In a possible implementation, a message 1 is used to distinguish between early uplink data transmission and early downlink data transmission. The access network device may be notified in a timely manner, to avoid that the access network device is not clear about whether the terminal device expects to perform early uplink data transmission or early downlink data transmission. Therefore, when early uplink data transmission needs to be performed, the access network device allocates a relatively large uplink resource allocation (UL Grant) or a plurality of UL grants when sending a random access response to the terminal device; and when early downlink transmission is performed, the access network device does not need to allocate a relatively large UL grant or a plurality of UL grants.

Optionally, the terminal device may send the first indication to the access network device by using a message 3 (Msg3). In other words, the Msg3 may include the first indication. The indication information is used to indicate that early downlink transmission needs to be performed. In other words, the downlink data needs to be received before the RRC connection is established. In this indication manner, when the message 1 is not used to distinguish between uplink and downlink, the message 3 may be used to indicate that the terminal device expects to perform early downlink data transmission.

Further, the Msg3 may be any one of the following messages: an RRC connection request message, an RRC connection reestablishment request message, and an RRC connection resume request message.

Further, the RRC connection request message or the RRC connection reestablishment request message carries a non-access-stratum protocol data unit NAS PDU that may include data that needs to be transmitted. In other words, the uplink data may be sent by using the NAS PDU in the RRC connection request message or the RRC connection reestablishment request message.

Optionally, the first indication may be a dedicated preamble (for example, denoted as a first random access preamble). In this case, in an embodiment of S210, the terminal device sends the first random access preamble to the access network device. The first random access preamble is used to indicate early uplink data transmission or early downlink data transmission.

Optionally, in another embodiment of S210, the terminal device may send a random access preamble to the access network device on a specific resource (for example, denoted as a first random access resource), to indicate early uplink data transmission or early downlink data transmission.

Optionally, the terminal device may indicate early data transmission by using a time-frequency-code resource. For example, if the terminal device uses a specific time-frequency-code resource (for example, a first time-frequency-code resource) to send a random access request message, it indicates that the terminal device needs to perform early uplink data transmission; if the terminal device uses another time-frequency-code resource (for example, a second time-frequency-code resource), it indicates that the terminal device needs to perform early downlink data reception. The time-frequency-code resource may be any combination of a time domain resource, a frequency domain resource, and a code domain resource, for example, different time-frequency resources, different code domain resources, and different time-frequency-code resources.

Optionally, when the terminal device is in a connected mode, the access network device may also send an indication to the terminal device by using a physical downlink control channel (PDCCH) order, to indicate that the UE needs to perform random access in a manner of early data transmission, for example, early uplink data transmission or early downlink data transmission, that is, perform random access by using the PDCCH order. Specific indication information may be carried in DCI.

S220. Transmit the data between the terminal device and the access network device before the RRC connection is established.

Optionally, a non-access-stratum protocol data unit NAS PDU may be transmitted between the terminal device and the access network device before the RRC connection is established, to transmit the data.

Optionally, the data may be alternatively transmitted between the terminal device and the access network device by using a data radio bearer DRB before the RRC connection is established.

Therefore, according to the method in this embodiment of this application, the data (including uplink data and downlink data) can be transmitted before the RRC is established, so that signaling overheads required for establishing a bearer for data transmission can be reduced, and power consumption of a device can be reduced.

The following separately describes the data transmission method in this embodiment of this application from perspectives of early uplink data transmission and early downlink data transmission.

Figure 3:
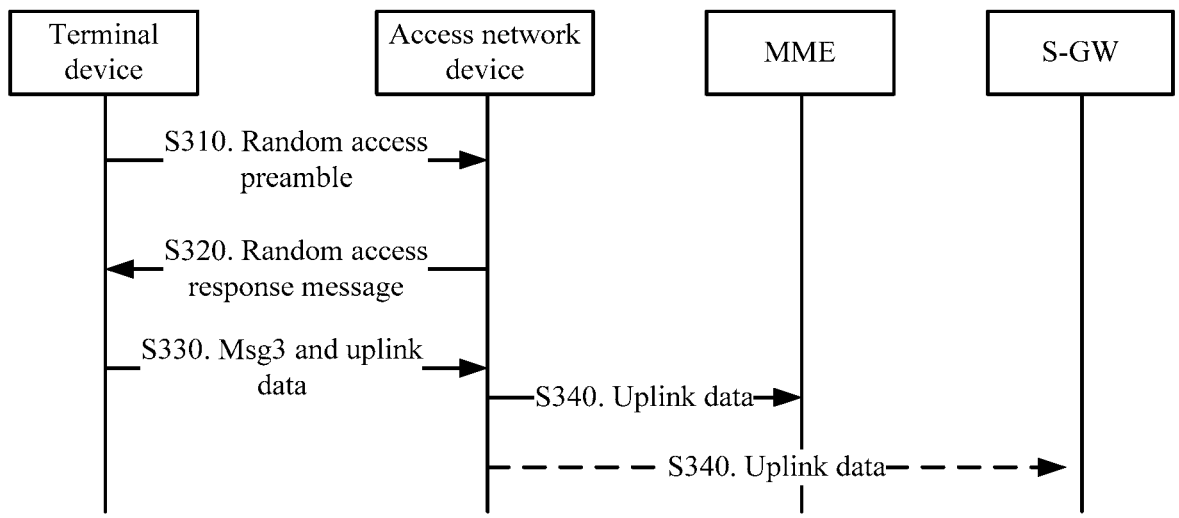
FIG. 3 is a schematic flowchart of a method for early uplink data transmission according to this application.

FIG. 3 is a schematic flowchart of a data transmission method according to an embodiment of this application. The method shown in FIG. 3 is applicable to early uplink data transmission.

S310. A terminal device sends a random access preamble to an access network device. To be specific, the terminal device sends a random access request message, namely, a message 1 (Msg1), to the access network device.

Optionally, the terminal device may send the Msg1 on a specific resource (for example, denoted as a random access resource #A). The random access resource #A may be used to indicate early uplink data transmission or early downlink data transmission.

Optionally, the terminal device may alternatively send a dedicated preamble (for example, denoted as a random access preamble #A). The random access preamble #A may also be used to indicate early uplink data transmission or early downlink data transmission.

It should be understood that the random access resource #A is an example of a first random access resource, or may be another example of, for example, a time-frequency-code combination; and the random access preamble #A is an example of a first random access preamble.

S320. After receiving the Msg1, the access network device sends a random access response message to the terminal device. To be specific, the access network device sends a message 2 (Msg2).

The Msg2 carries an uplink timing advance (TA) and an uplink resource allocation (UL Grant). The UL grant is a resource that is allocated by the access network device to the terminal device and that is used by the terminal device to transmit a message 3 (Msg3). For details about the TA and the UL grant, refer to the prior art. Details are not described herein.

Optionally, in this embodiment of this application, the access network device may learn, based on time-frequency-code resource information such as the first random access preamble or the first random access resource, that the UE expects to perform early data transmission. If the early data transmission is early uplink data transmission, the access network device allocates, to the terminal device, a resource used for transmitting uplink data. The resource used for transmitting the uplink data and the UL grant that are allocated by the access network device to the terminal device are collectively referred to as a target resource. The target resource allocated by the access network device may be a large uplink resource used to transmit the message 3 and the uplink data; or may be two independent resources: One is used to transmit the message 3, and the other is used to transmit the uplink data.

Further, a size of the target resource may be fixed, for example, 100 bytes. The size of the target resource may be alternatively determined by the access network device depending on the first random access resource or the first random access preamble. In other words, the first random access resource or the first random access preamble may be further used to indicate a size of the uplink data, so that the access network device can properly allocate, based on the size of the uplink data, the resource used for transmitting the uplink data. In other words, on a basis of indicating early uplink transmission, a size of a resource that needs to be allocated may be further distinguished based on an access resource.

S330. The terminal device sends the Msg3 and the uplink data to the access network device based on the Msg2.

It should be understood that the Msg3 and the uplink data may be transmitted together, or may be separately transmitted. When the Msg3 and the uplink data are transmitted together, the Msg3 may carry an identifier of the terminal device; or when the Msg3 and the uplink data are separately transmitted, the uplink data may carry an identifier of the terminal device, or may be scrambled by using the identifier of the terminal device.

For example, the identifier of the terminal device may be a cell radio network temporary identifier (RNTI), a hash serving temporary mobile subscriber identity (hash S-TMSI), an S-TMSI, a truncated S-TMSI, an access random number, an international mobile subscriber identity (IMSI), an identifier of the terminal device carried in a MAC CE, or the like. The identifier of the terminal device is not specifically limited in this application.

Optionally, after receiving the Msg2, if uplink data needs to be transmitted, the terminal device may transmit, while transmitting the Msg3, the uplink data on a preconfigured or reserved resource used for early uplink data transmission.

Optionally, the terminal device may transmit the Msg3 and the uplink data together on a target resource indicated by the Msg2.

In an embodiment of the Msg3, the Msg3 may be an RRC connection request message or an RRC connection reestablishment request message. The RRC connection request message or the RRC connection reestablishment request message carries a non-access-stratum protocol data unit NAS PDU including the uplink data. Therefore, early uplink data transmission can be implemented by using a control plane (CP) optimization (e.g., Control plane CIoT EPS optimization) scheme.

Further, when the Msg3 and the uplink data are separately transmitted, the NAS PDU may be added to a signaling radio bearer (SRB) 1 bits for sending. The message carrying the NAS PDU is an uplink direct transfer (UL information Transfer) message. In this way, the access network device may learn, based on a corresponding logical channel identifier (ID), that the terminal device uses the CP.

It should be understood that the RRC connection request message and the RRC connection reestablishment request message each are a type of the Msg3, the RRC connection request message is used to establish an RRC connection, and the RRC connection reestablishment request message is used to reestablish an RRC connection. For details about the RRC connection request message and the RRC connection reestablishment request message, refer to the prior art. Details are not described in this application.

In another embodiment of the Msg3, the Msg3 may be an RRC connection request message, an RRC connection resume request message, or an RRC connection reestablishment request message, and the uplink data is sent by using a data radio bearer DRB. Therefore, early uplink data transmission can be implemented by using a user plane (UP) optimization (e.g., User plane CIoT EPS optimization) scheme. Likewise, the data and the message 3 may be sent to the access network device together, or may be separately sent.

It should be understood that the RRC connection resume request message or the RRC connection reestablishment request message herein is used to resume an RRC connection after the access network device releases the RRC connection. For details, refer to the prior art. Details are not described in this application.

S340. The access network device sends the uplink data to an MME or an S-GW.

In conclusion, in a data transmission method in this application, if the access network device supports a capability of early data transmission, a resource may be reserved, so that when the terminal device has a requirement for early uplink data transmission, the uplink data is sent together with the Msg3 by using the reserved resource. In this case, the terminal device may indicate, to the access network device by using the Msg1, that the terminal device needs to perform early uplink data transmission, or may not indicate an early data transmission requirement of the terminal device to the access network device.

In another data transmission method in this application, if the access network device supports a capability of early data transmission, when the access network device knows that the terminal device needs to perform early uplink data transmission, for example, knows, by using the random access resource #A or the random access preamble #A, that the terminal device needs to perform early uplink data transmission, the access network device may allocate, to the terminal device, the resource used for transmitting the uplink data, for example, the target resource, so that the terminal device may send, while transmitting the Msg3, the uplink data by using the resource allocated by the access network device.

Therefore, according to the data transmission method in this embodiment of this application, early uplink data transmission can be implemented, so that power consumption and signaling overheads can be reduced.

Figure 4:
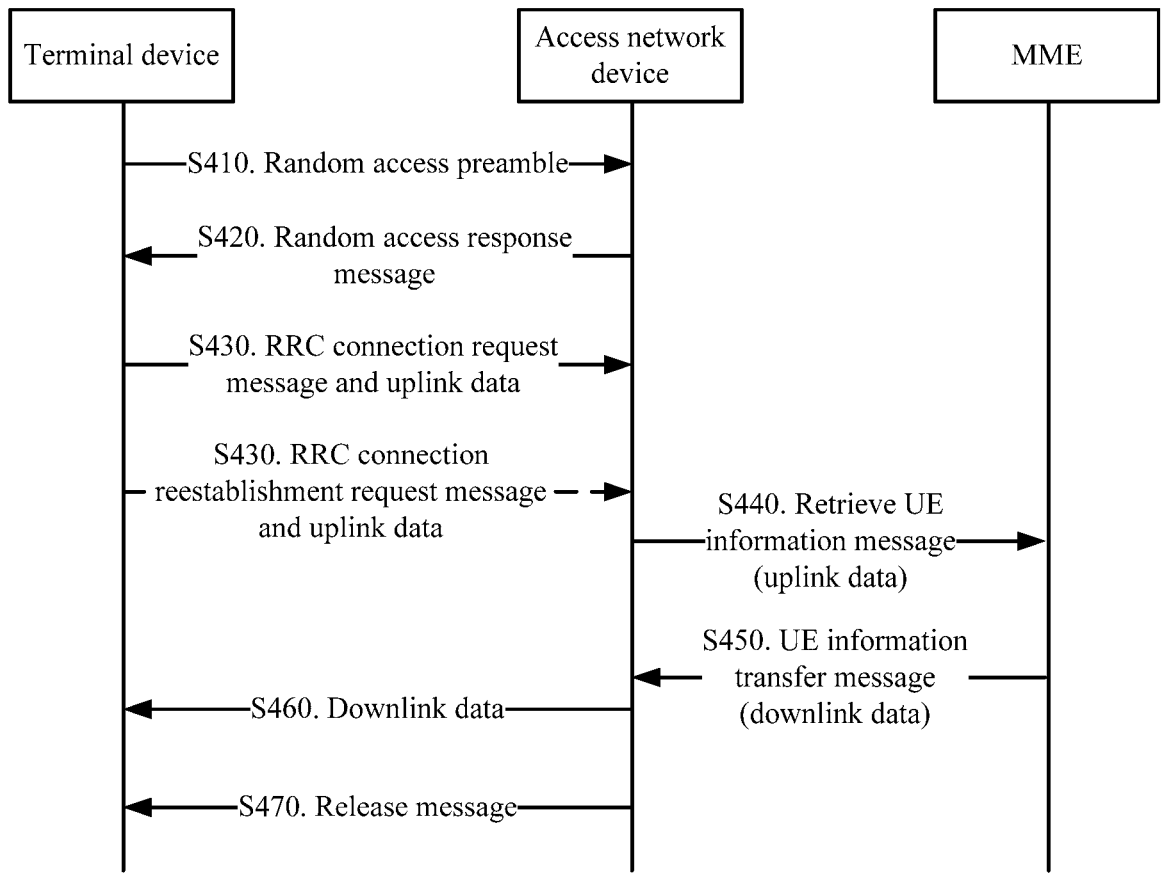
FIG. 4 is a schematic flowchart of a method for early uplink data transmission based on a CP scheme according to this application.
Figure 5:
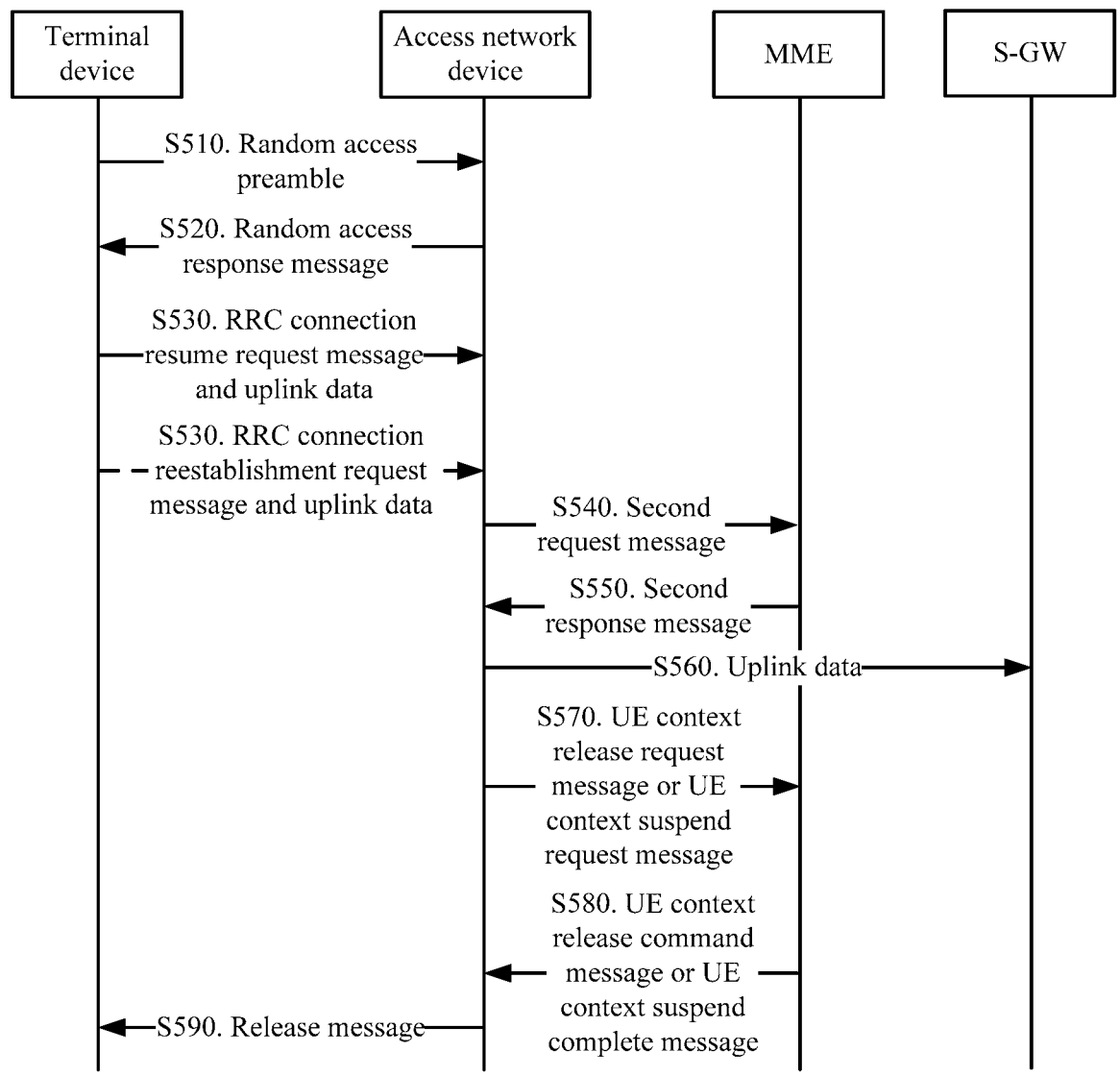
FIG. 5 is a schematic flowchart of a method for early uplink data transmission based on a UP scheme according to this application.

The following describes a CP-scheme-based data transmission method and a UP-scheme-based data transmission method with reference to FIG. 4 and FIG. 5, respectively. It should be understood that, for steps that are shown in FIG. 4 and FIG. 5 and that are the same as or correspond to those in FIG. 2, reference may be made to the foregoing descriptions of FIG. 2. To avoid repetition, when FIG. 4 and FIG. 5 are described, same or corresponding content is no longer described in detail.

FIG. 4 is a schematic flowchart of early uplink data transmission based on a CP scheme according to an embodiment of this application.

S410. A terminal device sends an Msg1 to an access network device.

S420. After receiving the Msg1, the access network device sends an Msg2 to the terminal device.

S430. The terminal device sends an RRC connection request message or an RRC connection reestablishment request message to the access network device, where the RRC connection request message or the RRC connection reestablishment request message carries a NAS PDU including the uplink data.

Optionally, the access network device may store terminal device capability information in the CP scheme. After receiving a message 3, the access network device may find, based on an S-TMSI, the terminal device capability information stored by the access network device. Then, the access network device may determine whether the terminal device has a capability of early data transmission. If the terminal device does not have the capability, the access network device may reject a connection or roll back to a normal procedure.

An exception needs to be handled: When an MME re-allocates an S-TMSI to the terminal device or an S-TMSI of the terminal device changes, the access network device does not know this because the S-TMSI is changed through transmission of NAS information. In this case, information (for example, information obtained from a UE information transfer message) stored by the access network device does not match a stored updated S-TMSI of the terminal device. Therefore, the S-TMSI carried in the message 3 sent by the terminal device may be an S-TMSI previously used by another terminal device. In this case, a terminal device capability and quality of service (QoS) information of the terminal device that are stored by the access network device may correspond thereto incorrectly. Therefore, the following several solutions are proposed:

a: When re-allocating an S-TMSI to a terminal device, the MME notifies the access network device, so that the access network device may delete stored information, including capability information and the like, corresponding to the S-TMSI, or the access network device is notified of the re-allocated S-TMSI. After receiving the re-allocated S-TMSI, the access network device updates an S-TMSI, so that the new S-TMSI of the terminal device can match related information of the terminal device. A notification message is an SLAP message, for example, a downlink NAS transfer message or a connection establishment indication message. To be specific, the downlink NAS transfer message carries the S-TMSI to update the S-TMSI, so that the S-TMSI corresponds to the related information of the terminal device that is previously received from the UE information transfer message.

b: During handover of an access network device, to ensure that an original access network device can delete a message and a re-allocation problem is avoided, when re-allocating an S-TMSI, the MME notifies several access network devices that are recently accessed by the terminal device, so that the access network devices can update an S-TMSI in a timely manner. Alternatively, the MME instructs the several access network devices that are recently accessed by the terminal device to delete a stored old S-TMSI and related information of the terminal device that corresponds to the old S-TMSI, for example, UE QoS and a radio capability of the terminal device.

c: The access network device and the MME each have a timer. When the access network device obtains an S-TMSI, the S-TMSI corresponds to a context of the terminal device. The access network device starts the timer, and deletes a related context when the timer overflows. The MME also has a timer. The timer starts after an S-TMSI is allocated. Before the timer overflows, the S-TMSI cannot be allocated to another terminal device.

S440. The access network device sends a retrieve UE information message to the MME. The retrieve terminal device information message includes the uplink data, and may also have another message name. A specific signaling name is not limited.

In this case, the MME can obtain the uplink data of the terminal device, thereby implementing early uplink data transmission.

Optionally, the retrieve terminal device information message further includes downlink data request indication information, and the method may further include the following steps:

S450. If the MME has downlink data, the MME sends a UE information transfer message to the access network device. The user information transfer message includes the downlink data, and may also have another message name. A specific signaling name is not limited.

S460. The access network device sends the downlink data to the terminal.

Optionally, the method may further include the following step:

S470. The access network device sends a release message to the terminal device. The release message is used to release the terminal device to an idle mode.

Optionally, the release message may be an RRC connection setup message, an RRC connection reestablishment message, an RRC connection resume message, an RRC connection reject message, or an RRC connection release message.

Further, if the access network device sends the RRC connection setup message, the RRC connection reestablishment message, or RRC connection resume message, the message may include related information in RRC connection release message, to release a connection of the terminal device. The message may specifically include a release cause, a redirection indication, and the like.

If the access network device sends the RRC connection reject message, the message may also carry indication information, for example, a cause value, to indicate that the terminal device is to be released to the idle mode.

If the access network device sends the RRC connection release message and carries identifier information of the terminal device, a MAC CE carrying the identifier may be added to an RRC message, to directly release the terminal device to the idle mode. Alternatively, after the terminal device sends a message 5, for example, the RRC connection setup complete message, to the access network device, the access network device may send the RRC connection release message to the terminal device.

Optionally, in a specific embodiment of S460, the access network device may send the downlink data to the terminal device by using the release message in S470. To be specific, the downlink data may be carried in the release message. Further, the downlink data is data encapsulated in a NAS PDU.

Optionally, S470 may also be performed in a scenario in which the MME has no downlink data transmission. To be specific, if the MME does not need to transmit downlink data, the access network device may send the release message to the terminal device, to release the terminal device to the idle mode.

When the MME has no downlink data transmission, the terminal device can be released in advance by using the RRC connection setup message, the RRC connection reestablishment message, RRC connection resume message, or the RRC connection reject message. Compared with a release procedure in the prior art, this can reduce signaling overheads, and can reduce power consumption of the terminal device.

FIG. 5 is a schematic flowchart of early uplink data transmission based on a UP scheme according to an embodiment of this application.

S510. A terminal device sends an Msg1 to an access network device.

S520. After receiving the Msg1, the access network device sends an Msg2 to the terminal device.

S530. The terminal device sends an RRC connection setup request, an RRC connection resume request message, or an RRC connection reestablishment request message to the access network device.

The uplink data may be sent by using a data radio bearer DRB. The uplink data needs to be encrypted. A key may be updated by obtaining a next hop chaining count (NCC) in a previous connection.

S540. The access network device sends a second request message to an MME.

Optionally, content in the second request message may be the same as content in a terminal device context resume request message.

Further, the second request message may be the terminal device context resume request message.

After receiving the RRC connection resume request message or the RRC connection reestablishment request message, the access network device verifies the terminal device based on a short message authentication code for integrity (short-MAC-I). If the access network device is not an original access network device, the short-MAC-I needs to be sent to a source access network device through an X2 interface. The source access network device performs verification. After the verification succeeds, context information of the terminal device is sent to the current access network device, and a subsequent operation is performed. S550. The MME sends a second response message to the access network device based on the second request message.

Optionally, content in the second response message may be the same as content in a terminal device context resume response message.

Further, the second response message is the terminal device context resume response message.

If the access network device finds, based on the received response message, that a radio access bearer (E-UTRAN radio access bearer, E-RAB) corresponding to data received by the access network device is rejected, the access network device sends an RRC connection resume message or an RRC connection setup message to the terminal device. The message may include indication information. The indication information is used to indicate that data transmission on the E-RAB is rejected or fails, or indicate that the terminal device needs to re-send a previously sent data packet. The access network device allocates an additional UL grant for the data transmission.

S560. The access network device receives the second response message, and sends the uplink data to an S-GW.

In this case, the S-GW can obtain the uplink data of the terminal device, thereby implementing early uplink data transmission.

Optionally, the method may further include the following steps:

S570. After successfully sending the uplink data, the access network device may send a terminal device context release request message or a terminal device context suspend request message to the MME.

S580. The MME sends a terminal device context release command message to the access network device based on the terminal device context release request message, or the MME sends a terminal device context suspend complete message to the access network device based on the context suspend request message.

S590. The access network device sends a release message to the terminal device based on the terminal device context release command message or the terminal device context suspend complete message. The release message is used to release the terminal device to an idle mode.

Optionally, the release message herein may be an RRC connection setup message, an RRC connection resume message, an RRC connection reestablishment message, an RRC connection reject message, or an RRC connection release message.

Further, if the access network device sends the RRC connection setup message, the RRC connection reestablishment message, or the RRC connection resume message, the message may include related information in RRC connection release message, to release a connection of the terminal device. The message may specifically include a release cause, a redirection indication, and the like.

If the access network device sends the RRC connection reject message, the message may also carry indication information, for example, a cause value, to indicate that the terminal device is to be released to the idle mode.

If the access network device sends the RRC connection release message, the terminal device is directly released to the idle mode.

If the access network device also receives downlink data in this process, the downlink data and the release message may be sent to the terminal device together.

When the S-GW has no downlink data transmission, the terminal device can be released in advance by using the RRC connection setup message, the RRC connection resume message, an RRC connection reestablishment complete message, the RRC connection reject message, or the RRC connection release message. Compared with a release procedure in the prior art, this can reduce signaling overheads, and can reduce power consumption of the terminal device.

Figure 6:
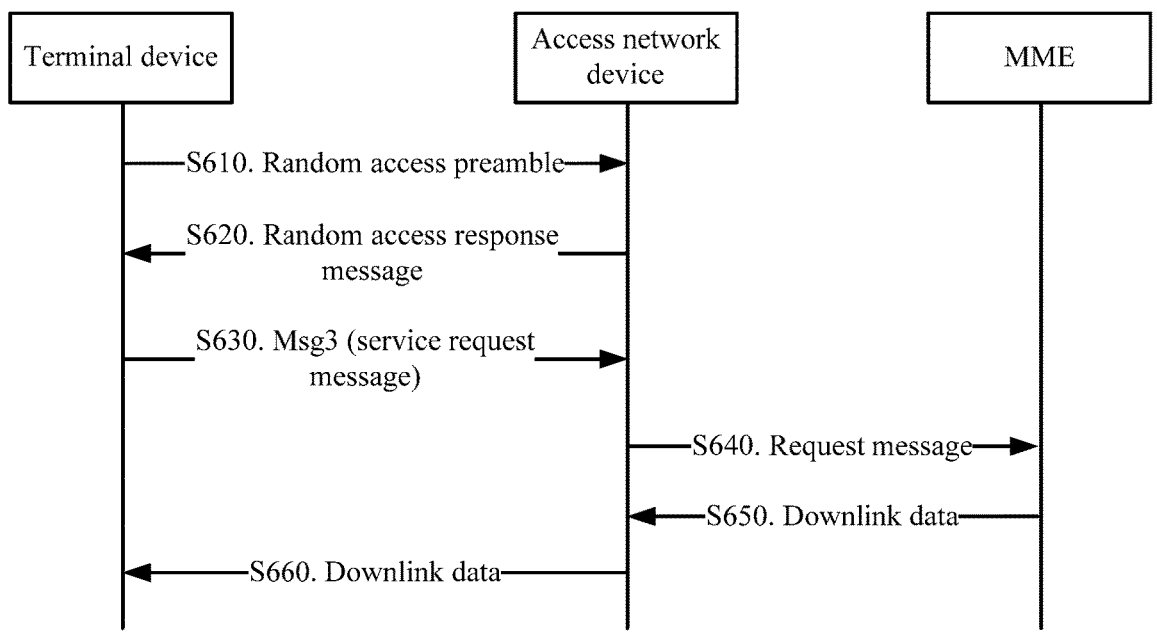
FIG. 6 is a schematic flowchart of a method for early downlink data transmission based on a CP scheme according to this application.

FIG. 6 shows a data transmission method based on a CP scheme according to another embodiment of this application. The method shown in FIG. 6 is applicable to early downlink data transmission.

S610. A terminal device sends a random access preamble to an access network device. To be specific, the terminal device sends a random access request message, namely, a message 1 (Msg1), to the access network device. For details, refer to the prior art. For brevity, details are not described herein.

S620. After receiving the Msg1, the access network device sends a random access response message to the terminal device. To be specific, the access network device sends a message 2 (Msg2).

The Msg2 carries a TA and a UL grant. The UL grant is a resource that is allocated by the access network device to the terminal device and that is used by the terminal device to transmit a message 3 (Msg3). For details about the TA and the UL grant, refer to the prior art. Details are not described herein.

S630. The terminal device sends the Msg3 to the access network device. The Msg3 may include a service request message.

When early downlink transmission is not distinguished by using the message 1 or a time-frequency-code resource, the message 3 may be used to indicate that the UE needs to perform early downlink data transmission. In other words, downlink data is transmitted before an RRC connection is established. In this case, after receiving the indication message, the access network device may trigger signaling interaction with a core network device relatively early.

Optionally, the Msg3 may be an RRC connection request message or an RRC connection reestablishment request message.

S640. After receiving the Msg3, the access network device sends a request message to an MME.

The message may be a retrieve UE information message or another message.

S650. After receiving the request message, the MME sends the downlink data to the access network device.

Optionally, the MME may send the downlink data to the access network device by using a UE information transfer message. In other words, the UE information transfer message may carry the downlink data.

S660. The access network device sends the downlink data to the terminal device.

Optionally, the access network device may send the downlink data to the terminal device by using a release message. In addition, after receiving the release message, the terminal device may enter an idle mode.

Optionally, the release message herein may be an RRC connection setup message, an RRC connection resume message, an RRC connection reestablishment message, an RRC connection reject message, or an RRC connection release message.

Further, if the access network device sends the RRC connection setup message, the RRC connection reestablishment message, or the RRC connection resume message, the message may include related information in RRC connection release message, to release a connection of the terminal device. The message may specifically include a release cause, a redirection indication, and the like.

If the access network device sends the RRC connection reject message, the message may also carry indication information, for example, a cause value, to indicate that the terminal device is to be released to the idle mode.

If the access network device sends the RRC connection release message, the terminal device is directly released to the idle mode.

When the MME has no downlink data transmission, the terminal device can be released in advance by using the RRC connection setup message, the RRC connection resume message, the RRC connection reestablishment message, the RRC connection reject message, or the RRC connection release message. Compared with a release procedure in the prior art, this can reduce signaling overheads, and can reduce power consumption of the terminal device.

Therefore, according to the data transmission method in this embodiment of this application, early downlink data transmission can be implemented, so that power consumption and signaling overheads can be reduced.

Figure 7:
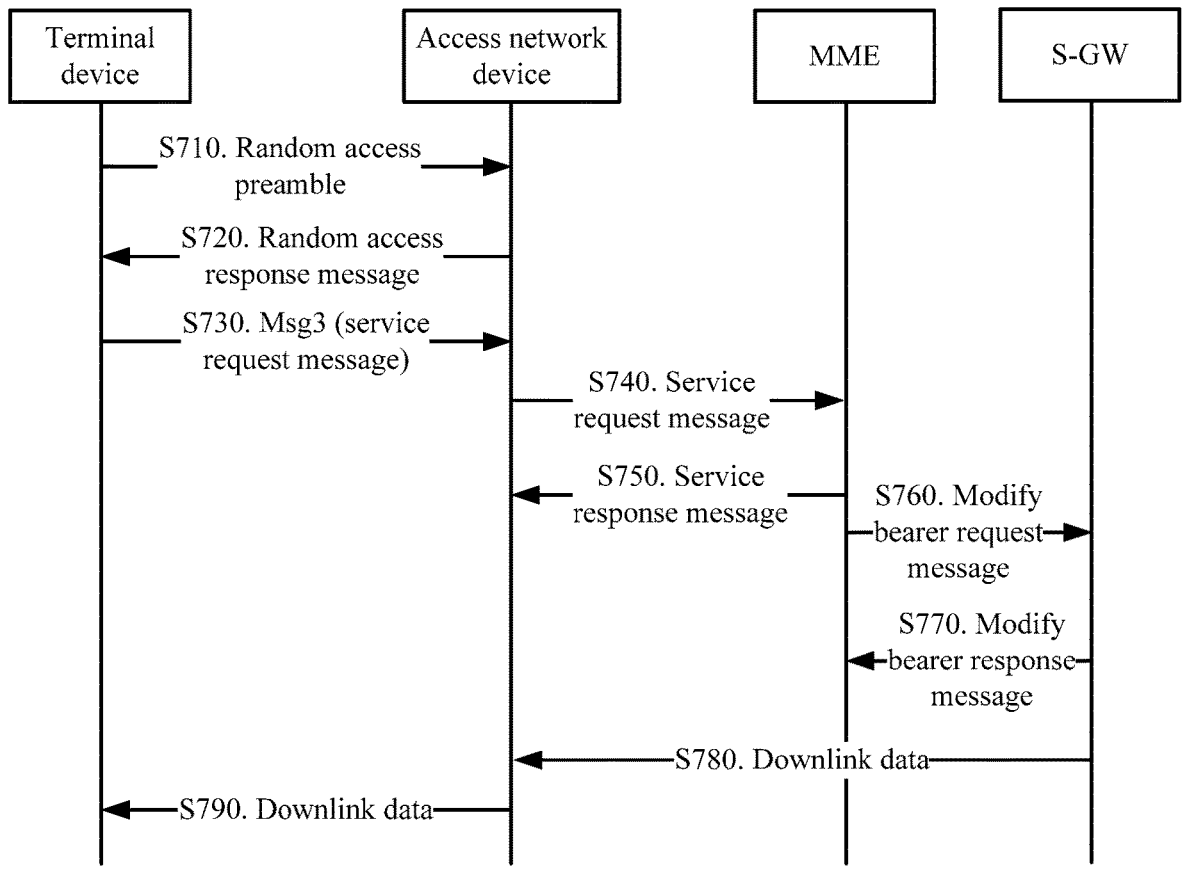
FIG. 7 is a schematic flowchart of a method for early downlink data transmission based on a UP scheme according to this application.

FIG. 7 shows a data transmission method based on a UP scheme according to another embodiment of this application. The method shown in FIG. 7 is applicable to early downlink data transmission.

FIG. 7 is a schematic flowchart of a data transmission method according to an embodiment of this application.

S710. A terminal device sends a random access preamble to an access network device. To be specific, the terminal device sends a random access request message, namely, a message 1 (Msg1), to the access network device. For details, refer to the prior art. For brevity, details are not described herein.

S720. After receiving the Msg1, the access network device sends a random access response message to the terminal device. To be specific, the access network device sends a message 2 (Msg2).

The Msg2 carries a TA and a UL grant. The UL grant is a resource that is allocated by the access network device to the terminal device and that is used by the terminal device to transmit a message 3 (Msg3). For details about the TA and the UL grant, refer to the prior art. Details are not described herein.

S730. The terminal device sends the Msg3 to the access network device based on the Msg2. The Msg3 may include a service request message.

If early downlink transmission is not distinguished by using the message 1 or a time-frequency-code resource, the message 3 may be used to indicate early downlink data transmission. In other words, downlink data is transmitted before an RRC connection is established. In this case, after receiving the indication message, the access network device may trigger signaling interaction with a core network device relatively early. For details, refer to S740 and subsequent operations.

Optionally, the Msg3 may be an RRC connection request message, an RRC connection resume request message, or an RRC connection reestablishment request message.

S740. After receiving the service request message in the Msg3, the access network device sends the service request message to an MME.

Optionally, the access network device may send the service request message to the MME by using a terminal device context resume request message.

S750. The MME sends a service response message to the access network device based on the service request message.

Optionally, after receiving the terminal device context resume request message sent by the access network device, the MME may send a terminal device context resume response message to the access network device.

S760. The MME sends a modify bearer request message to an S-GW.

S770. The S-GW returns a modify bearer response message to the MME, so that the S-GW can obtain an address of the access network device.

S780. The S-GW sends the downlink data to the access network device.

S790. The access network device sends the downlink data to the terminal device.

Optionally, before S780, after the access network device receives the downlink data sent by the S-GW, the method may further include:

sending, by the access network device, a terminal device context release request message or a terminal device context suspend request message to the MME;

sending, by the MME, a terminal device context release command message to the access network device based on the terminal device context release request message, or sending, by the MME, a terminal device context suspend complete message to the access network device based on the context suspend request message; and sending, by the access network device, the release message to the terminal device based on the terminal device context release command message or the terminal device context suspend complete message, where the release message is used to release the terminal device to an idle mode.

Optionally, the release message herein may be an RRC connection setup message, an RRC connection resume message, an RRC connection reestablishment message, an RRC connection reject message, or an RRC connection release message. For specific release information, refer to other embodiments.

Further, if the access network device sends the RRC connection setup message, the message may include related information in RRC connection release message, to release a connection of the terminal device. The message may specifically include a release cause, a redirection indication, and the like.

If the access network device sends the RRC connection reject message, the message may also carry a cause value for sending. The cause value indicates that the terminal device is to be released to the idle mode.

If the access network device sends the RRC connection release message, the terminal device is directly released to the idle mode.

Optionally, in S790, the access network device may send the downlink data to the terminal device by using the release message.

When the S-GW has no downlink data transmission, the terminal device can be released in advance by using the RRC connection setup message, the RRC connection resume message, the RRC connection reestablishment complete message, the RRC connection reject message, or the RRC connection release message. Compared with a release procedure in the prior art, this can reduce signaling overheads, and can reduce power consumption of the terminal device.

Therefore, according to the data transmission method in this embodiment of this application, early uplink data transmission can be implemented, so that power consumption and signaling overheads can be reduced.

Optionally, in a possible implementation, when the UE receives a paging message, the paging message may include indication information, to indicate that the UE can perform an operation of early downlink data reception. In this way, the UE may perform a subsequent procedure based on the operation of early downlink data reception. Further, a core network device may add indication information to a paging message to be sent to a base station, to indicate that the UE needs to perform the operation of early downlink data reception.

Optionally, when the terminal device is in a connected mode, the access network device may also send an indication to the terminal device by using a physical downlink control channel (PDCCH) order, to indicate that the UE needs to perform random access in a manner of early data transmission, for example, early uplink data transmission or early downlink data transmission, that is, perform random access by using the PDCCH order. Specific indication information may be carried in DCI. Alternatively, a location of a resource that is accessed by the UE and that is indicated by the access network device is a location of a resource used for early data transmission, to implement early data transmission. In this way, in the connected mode, the access network device can instruct, by using a PDCCH, the UE to perform early data transmission.

Figure 8:
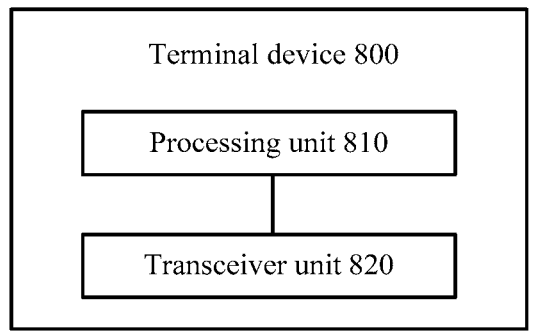
FIG. 8 is a schematic block diagram of a terminal device according to this application.

FIG. 8 is a schematic block diagram of a terminal device 800 according to an embodiment of this application. As shown in FIG. 8, the terminal device 800 includes a processing unit 810 and a transceiver unit 820.

The processing unit 810 is configured to generate a first indication, where the first indication is used to indicate that data needs to be transmitted before a radio resource control RRC connection is established.

The transceiver unit 820 is configured to: send the first indication to an access network device, where the first indication is used to indicate that the data needs to be transmitted before the radio resource control RRC connection is established; and transmit the data between the terminal device and the access network device before the RRC connection is established.

Optionally, when the first indication is a random access preamble, the transceiver unit 820 is specifically configured to send a first random access preamble to the access network device.

Optionally, the transceiver unit 820 is specifically configured to send a random access preamble to the access network device on a first random access resource.

Optionally, the transceiver unit 820 is specifically configured to send a message 3 that includes the first indication to the access network device. The message 3 is any one of the following messages:

an RRC connection request message, an RRC connection reestablishment request message, and an RRC connection resume request message, where the RRC connection request message or the RRC connection reestablishment request message carries a non-access-stratum protocol data unit NAS PDU including the data that needs to be transmitted.

Optionally, that the first indication is used to indicate that data needs to be transmitted before a radio resource control RRC connection is established includes:

the first indication is used to indicate that downlink data needs to be transmitted before the RRC connection is established.

Optionally, the transceiver unit 820 is specifically configured to: transmit a non-access-stratum protocol data unit NAS PDU between the terminal device and the access network device before the RRC connection is established; or transmit the data between the terminal device and the access network device by using a data radio bearer DRB before the RRC connection is established.

Optionally, the transceiver unit 820 is specifically configured to receive a release message sent by the access network device, where the release message is a radio resource control RRC connection setup message, an RRC connection resume message, an RRC connection reestablishment complete message, an RRC connection reject message, or an RRC connection release message, and the release message is used to release the terminal device to an idle mode.

It should be understood that the processing unit 810 may be implemented by a processor, and the transceiver unit 820 may be implemented by a transceiver.

It should be further understood that the terminal device 800 may correspond to the terminal device described in the foregoing methods, and the modules or units in the terminal device 800 are configured to perform the actions or the processing processes performed by the terminal device in the method embodiments shown in FIG. 2 to FIG. 7. Herein, to avoid repetition, detailed descriptions thereof are omitted.

Figure 9:
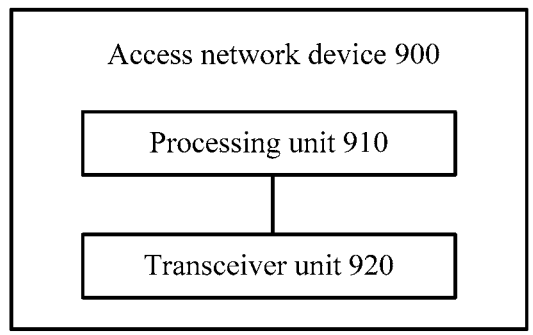
FIG. 9 is a schematic block diagram of an access network device according to this application.

FIG. 9 is a schematic block diagram of an access network device 900 according to an embodiment of this application. As shown in FIG. 9, the access network device 900 includes a processing unit 910 and a transceiver unit 920.

The transceiver unit 920 is configured to: receive a first indication sent by a terminal device, where the first indication is used to indicate that data needs to be transmitted before a radio resource control RRC connection is established.

The processing unit 910 is configured to determine whether a current status is that the RRC connection has not been established.

The transceiver unit 920 is configured to transmit the data between the access network device and the terminal device when the processing unit 910 determines that the RRC connection has not been established.

Optionally, when the first indication is a random access preamble, the transceiver unit 920 is specifically configured to receive a first random access preamble sent by the terminal device.

Optionally, the transceiver unit 920 is specifically configured to receive a random access preamble sent by the terminal device on a first random access resource.

Optionally, the transceiver unit 920 is specifically configured to receive a message 3 that includes the first indication and that is sent by the terminal device. The message 3 is any one of the following messages:

an RRC connection request message, an RRC connection reestablishment request message, and an RRC connection resume request message, where the RRC connection request message or the RRC connection reestablishment request message carries a non-access-stratum protocol data unit NAS PDU including the data that needs to be transmitted.

Optionally, that the first indication is used to indicate that data needs to be transmitted before a radio resource control RRC connection is established includes:

the first indication is used to indicate that downlink data needs to be transmitted before the RRC connection is established.

Optionally, the transceiver unit 920 is specifically configured to: transmit a non-access-stratum protocol data unit NAS PDU between the access network device and the terminal device before the RRC connection is established; or transmit the data between the access network device and the terminal device by using a data radio bearer DRB before the RRC connection is established.

Optionally, the transceiver unit 920 is specifically configured to send a release message to the terminal device, where the release message is a radio resource control RRC connection setup message, an RRC connection resume message, an RRC connection reestablishment complete message, an RRC connection reject message, or an RRC connection release message, and the release message is used to release the terminal device to an idle mode.

It should be understood that the processing unit 910 may be implemented by a processor, and the transceiver unit 920 may be implemented by a transceiver.

It should be further understood that the access network device 900 may correspond to the access network device described in the foregoing methods, and the modules or units in the access network device 900 are configured to perform the actions or the processing processes performed by the access network device in the method embodiments shown in FIG. 2 to FIG. 7. Herein, to avoid repetition, detailed descriptions thereof are omitted.

Figure 10:
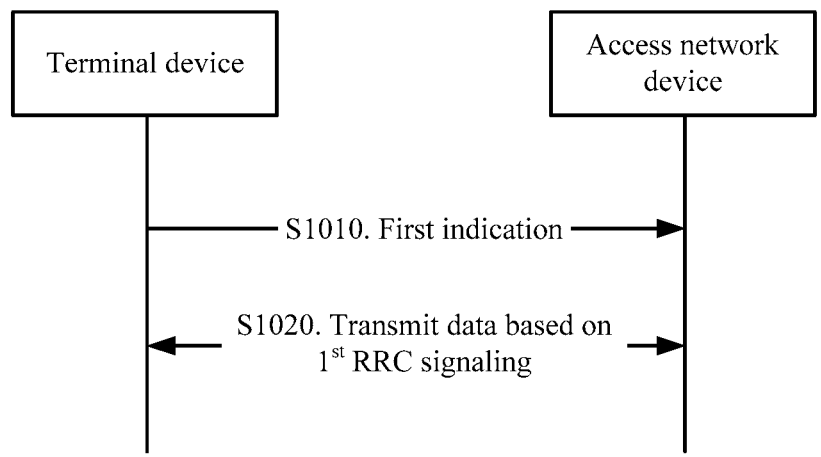
FIG. 10 is a schematic flowchart of a data transmission method according to another embodiment of this application.

FIG. 10 is a schematic flowchart of a data transmission method according to another embodiment of this application. It should be understood that FIG. 10 shows detailed communication steps or operations of the method. However, these steps or operations are merely examples, and other operations or variations of various operations in FIG. 10 may be further performed in this embodiment of this application. In addition, the steps in FIG. 10 may be performed in a sequence different from that shown in FIG. 10, and not all operations in FIG. 10 may be performed.

S1010. A terminal device sends a first indication to an access network device. Correspondingly, the access network device receives the first indication.

The first indication is used to indicate that the terminal device is to transmit data (that is, uplink data) based on $1^{st}$ radio resource control RRC signaling to be sent by the terminal device to the access network device, and/or the first indication is used to indicate that the access network device is to transmit data (that is, downlink data) based on $1^{st}$ radio resource control RRC signaling to be sent by the access network device to the terminal device. Specifically, the first indication is used to instruct to: add the data to first signaling transmitted between the terminal device and the access network device, transmit the data while transmitting the first signaling, or transmit the data right after transmitting the first signaling. The first signaling is the $1^{st}$ RRC signaling between the terminal device and the access network device in a random access process. To be specific, the first indication is used to indicate that the terminal device is to transmit the uplink data based on the $1^{st}$ RRC signaling between the terminal device and the access network device, and/or the first indication is used to indicate that the access network device is to transmit the downlink data based on the $1^{st}$ RRC signaling between the access network device and the terminal device.

In the following, for ease of description and understanding, the $1^{st}$ RRC signaling sent by the terminal device to the access network device is denoted as RRC signaling #1, and the $1^{st}$ RRC signaling sent by the access network device to the terminal device is denoted as RRC signaling #2.

Correspondingly, the terminal device may send the uplink data to the access network device based on the RRC signaling #1, and the access network device may send the downlink data to the terminal device based on the RRC signaling #2. In other words, the terminal device may perform early uplink data transmission based on the RRC signaling #1, and the access network device may perform early downlink data transmission based on the RRC signaling #2.

Optionally, the RRC signaling #1 may be a message 3 (Msg3).

For example, the Msg3 may be an RRC connection request message, an RRC connection reestablishment request message, or an RRC connection resume request message.

For details about the RRC connection request message, the RRC connection reestablishment request message, and the RRC connection resume request message, refer to the prior art. For brevity, details are not described herein.

In addition, the RRC signaling #1 may alternatively be newly-defined $1^{st}$ RRC signaling (for example, denoted as an RRC connection data transmission message) sent by the terminal device to the access network device in the random access process. The RRC connection data transmission message is a message that does not require RRC connection management. The RRC connection data transmission message may be the first message that follows a message 2 (Msg2, that is, a random access response message).

Further, the RRC signaling #1 may carry release assistance indication (RAI) information, to indicate that there is no uplink data within a short time. The terminal device remains in an RRC idle mode based on the release assistance indication information.

Further, if the data is transferred by using a NAS message, when the data is sent, release assistance indication (RAI) information may be alternatively carried in the NAS message. The indication message may indicate, to a core network device, whether there is uplink data or downlink data, or indicate a reception acknowledgement or response for the uplink data.

For ease of understanding, without loss of generality, the following describes the data transmission method in this application by using the message 3 as an example of the RRC signaling #1.

Optionally, the terminal device may send the first indication to the access network device by sending the message 1 (Msg1), namely, a random access request message. To be specific, the message 1 or information in the message 1 may be used to indicate early uplink data transmission or early downlink data transmission.

For example, a preamble (or referred to as a preamble sequence) in the message 1 may be used to indicate early uplink data transmission and/or early downlink data transmission. For example, if the preamble in the message 1 is a preamble #2, early uplink data transmission is indicated; if the preamble in the message 1 is a preamble #3, early downlink data transmission is indicated; or if the preamble in the message 1 is a preamble #3, both early uplink data transmission and early downlink data transmission are indicated.

For example, the terminal device may send the message 1 to the access network device on a specific resource, and the specific resource is used to indicate early uplink data transmission and/or early downlink data transmission. The specific resource may be a time-frequency-code resource. For example, if the terminal device uses a time-frequency-code resource #2 to send the message 1, it indicates that the terminal device is to perform early uplink data transmission; or if the terminal device uses a time-frequency-code resource #3, it indicates that the terminal device is to perform early downlink data transmission. A time-frequency-code resource may be any combination of a time domain resource, a frequency domain resource, and a code domain resource.

In addition, in a scenario of early uplink data transmission, for example, while allocating, to the terminal device by using the message 2 (Msg2), namely, the random access response message, a time-frequency resource used for sending the RRC signaling #1, the access network device may further allocate a time-frequency resource for sending uplink data.

FIG. 11 to FIG. 14 show several formats of the message 2. In this application, any one of the formats may be used for the message 2.

The formats of the message 2 that are shown in FIG. 11 to FIG. 14 each include an uplink timing advance command (TAC) field and a temporary cell radio network temporary identifier (TC-RNTI) field. A value in the uplink timing advance command field indicates a timing advance adjustment value, and is used by the terminal device to perform uplink synchronization. A value in the radio network temporary identifier field indicates a unique identifier allocated by the access network device to the terminal device in a cell. For details about the timing advance adjustment value and the C-RNTI, refer to the prior art. Details are not described in this specification.

For example, the TC-RNTI may be an RNTI, a hash S-TMSI, an S-TMSI, a truncated S-TMSI, an access random number, an IMSI, an identifier of the terminal device carried in a MAC CE, or the like. The identifier of the terminal device is not specifically limited in this application.

The following separately describes in detail the formats of the message 2 that are shown in FIG. 11 to FIG. 14.

FIG. 11 is a schematic diagram of a format of the message 2. As shown in FIG. 11, a value in a reserved field (R) is used to indicate a quantity of uplink resource allocation (UL Grant) fields included in the message 2. For example, when the value in the reserved field is 1, it indicates that the message 2 includes two uplink resource allocation fields (denoted as a UL Grant #1 and a UL Grant #2, respectively), where the UL grant #1 is not adjacent to the UL grant #2. A value in the UL grant #1 is used to indicate a time-frequency resource used for sending the RRC signaling #1, and a value in the UL grant #2 is used to indicate a time-frequency resource used for sending the uplink data.

It should be understood that a quantity of bits occupied by each field in the message 2 shown in FIG. 11 is merely an example, and the quantity of bits occupied by each field in the message 2 is not specifically limited in this application. For example, the UL grant #1 and the UL grant #2 that are shown in FIG. 11 occupy 20 bits and 16 bits, respectively. During actual application, the UL grant #1 and the UL grant #2 may alternatively occupy 16 bits and 20 bits, respectively, or each occupy 16 bits.

FIG. 12 is a schematic diagram of another format of the message 2. As shown in FIG. 12, a value in a reserved field (R) is used to indicate a quantity of uplink resource allocation (UL Grant) fields included in the message 2. For example, when the value in the reserved field is 1, it indicates that the message 2 includes two uplink resource allocation fields (denoted as a UL Grant #1 and a UL Grant #2, respectively), where the UL grant #1 is adjacent to the UL grant #2. A value in the UL grant #1 is used to indicate a time-frequency resource used for sending the RRC signaling #1, and a value in the UL grant #2 is used to indicate a time-frequency resource used for sending the uplink data.

It should be understood that a quantity of bits occupied by each field in the message 2 shown in FIG. 12 is merely an example, and the quantity of bits occupied by each field in the message 2 is not specifically limited in this application. For example, the UL grant #1 and the UL grant #2 that are shown in FIG. 12 occupy 20 bits and 16 bits, respectively.

During actual application, the UL grant #1 and the UL grant #2 may alternatively occupy 16 bits and 20 bits, respectively, or each occupy 16 bits.

FIG. 13 is a schematic diagram of another format of the message 2. As shown in FIG. 13, a value in a reserved field (R) is used to indicate a function of a time-frequency resource indicated by an uplink resource allocation (UL Grant) field. For example, when the value in the reserved field is 1, it indicates that the time-frequency resource indicated by the UL grant field is used to transmit the RRC signaling #1 and the uplink data; or when the value in the reserved field is 0, it indicates that the time-frequency resource indicated by the value in the UL grant is used to transmit only the RRC signaling #1. Alternatively, when the value in the reserved field is 0, it indicates that the time-frequency resource indicated by the UL grant field is used to transmit the RRC signaling #1 and the uplink data; or when the value in the reserved field is 1, it indicates that the time-frequency resource indicated by the value in the UL grant is used to transmit only the RRC signaling #1. It should be understood that a quantity of bits occupied by each field in the message 2 shown in FIG. 13 is merely an example, and the quantity of bits occupied by each field in the message 2 is not specifically limited in this application. For example, the UL grant shown in FIG. 13 occupies 36 bits. During actual application, the UL grant may occupy 30 bits.

Figures 14, 15:
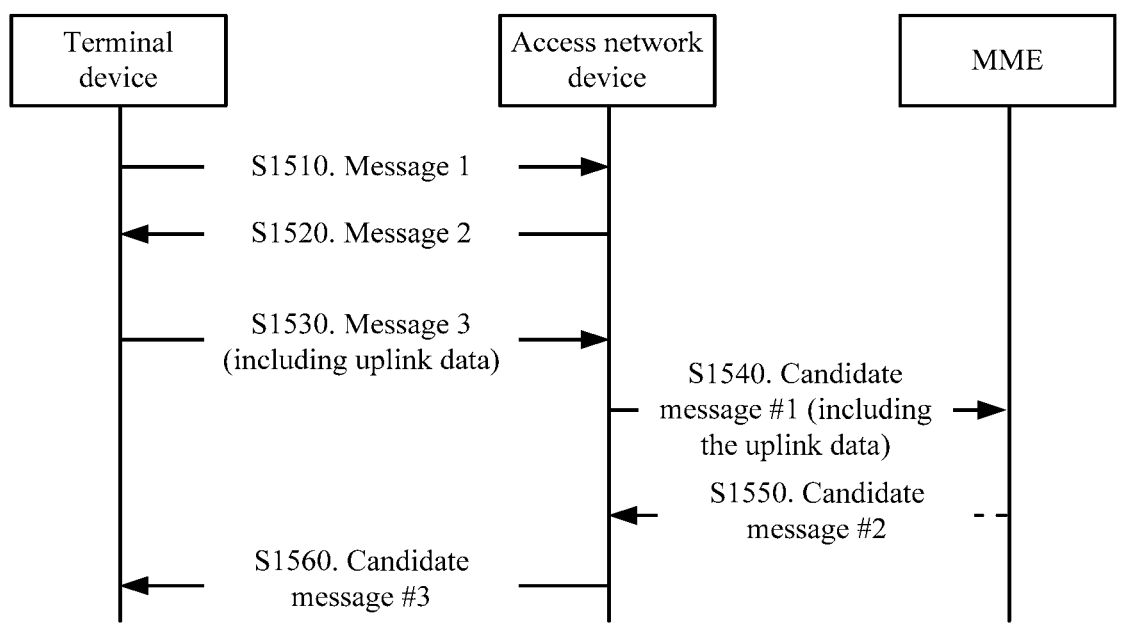
FIG. 14 is a schematic diagram of yet another format of a message 2.
FIG. 15 is a schematic flowchart of another method for early uplink data transmission based on a CP scheme according to this application.

FIG. 14 is a schematic diagram of a format of the message 2. As shown in FIG. 14, a value in a first reserved field (R #1) or a value of a first bit in a second reserved field (R #2) is used to indicate a quantity of uplink resource allocation (UL Grant) fields included in the message 2. For example, when the value in the R #2 is 1, it indicates that the message 2 includes two uplink resource allocation fields (denoted as a UL Grant #1 and a UL Grant #2, respectively). A value in the UL grant #1 is used to indicate a time-frequency resource used for sending the RRC signaling #1, and a value in the UL grant #2 is used to indicate a time-frequency resource used for sending the uplink data.

It should be understood that the first bit in the R #2 may be any bit in the R #2. A quantity of bits occupied by each field in the message 2 shown in FIG. 14 is merely an example, and the quantity of bits occupied by each field in the message 2 is not specifically limited in this application.

It should be further understood that the formats of the message 2 that are shown in FIG. 11 to FIG. 14 are merely examples, and other formats or variations of the formats in FIG. 11 to FIG. 14 may be further used for the message 2 in this embodiment of this application. For example, a location of each field in the message 2 may be different from a location of each field in the formats of the message 2 that are shown in FIG. 11 to FIG. 14. For another example, a format of the message 2 may further include a field other than the fields shown in FIG. 11 to FIG. 14, or a format of the message 2 may include only some of the fields shown in FIG. 11 to FIG. 14.

In conclusion, in the foregoing embodiment, a reserved bit may be used to indicate whether there are two or more UL grants or whether there is a large UL grant (which can be used to transmit data).

Optionally, the RRC signaling #2 may be a message 4 (Msg4).

For example, the message 4 may be a contention resolution message, an RRC connection setup message, an RRC connection reestablishment message, an RRC connection resume message, an RRC connection reject message, or an RRC connection release message.

In addition, the message 4 may alternatively be newly-defined $1^{st}$ RRC signaling sent by the access network device to the terminal device in the random access process. This is not limited in this embodiment of this application.

S1020. Transmit the data between the terminal device and the access network device based on the $1^{st}$ RRC signaling.

To be specific, the terminal device sends the uplink data to the access network device based on the RRC signaling #1, and/or the access network device sends the downlink data to the terminal device based on the RRC signaling #2.

Optionally, the uplink data and/or the downlink data may be sent by using a non-access-stratum protocol data unit NAS PDU.

For example, the RRC signaling #1 may carry a NAS PDU including the uplink data. To be specific, the terminal device may send the uplink data by using the NAS PDU carried in the RRC signaling #1. For another example, the terminal device may simultaneously send, to the access network device, the RRC signaling #1 and the NAS PDU carrying the uplink data, or the terminal device sends the NAS PDU carrying the uplink data right after sending the RRC signaling #1.

For another example, the RRC signaling #2 may carry a NAS PDU including the downlink data. To be specific, the access network device may send the downlink data by using the NAS PDU carried in the RRC signaling #2. For another example, the access network device may simultaneously send, to the terminal device, the RRC signaling #2 and the NAS PDU carrying the downlink data, or the access network device sends the NAS PDU carrying the downlink data right after sending the RRC signaling #2.

Optionally, the uplink data or the downlink data may be sent by using a DRB or an SRB0.

In this application, one transport block may be multiplex by the uplink data and the RRC signaling #1, or the uplink data and the RRC signaling #1 may be separately transmitted as two or more transport blocks. One transport block may be multiplex by the downlink data and the RRC signaling #2, or the downlink data and the RRC signaling #2 may be separately transmitted as two or more transport blocks.

It should be noted that when the RRC signaling #1 and the uplink data are transmitted together, the RRC signaling #1 may carry an identifier of the terminal device; or when the RRC signaling #1 and the uplink data are separately transmitted, the uplink data may carry an identifier of the terminal device, or may be scrambled by using the identifier of the terminal device. Likewise, when the RRC signaling #2 and the downlink data are transmitted together, the RRC signaling #2 may carry the identifier of the terminal device; or when the RRC signaling #2 and the downlink data are separately transmitted, the downlink data may carry the identifier of the terminal device, or may be scrambled by using the identifier of the terminal device.

For example, the identifier of the terminal device may be an RNTI, a hash S-TMSI, an S-TMSI, a truncated S-TMSI, an access random number, an IMSI, an identifier of the terminal device carried in a MAC CE, or the like. The identifier of the terminal device is not specifically limited in this application.

Further, uplink data transmission is used as an example. If the uplink data and the RRC signaling #1 may be separately transmitted as two transport blocks, the NAS PDU carrying the uplink data may be sent by using an SRB1 bis or an SRB0; or the RRC signaling #1 is sent by using an SRB0, and the uplink data is sent by using a DRB. It should be understood that for a manner of downlink data transmission, reference may be made to the manner of uplink data transmission. For brevity, details are not described herein again.

Further, if the terminal device sends the uplink data in the message 3 by using the NAS message, the NAS message may be a control plane service request (Control Plane Service Request (ESM Data Transport)) message.

Therefore, according to the method in this embodiment of this application, the uplink data and/or the downlink data can be transmitted based on the $1^{st}$ RRC signaling between the terminal device and the access network device, without a need of establishing an RRC connection. This can reduce signaling overheads required for establishing a bearer for data transmission, and can reduce power consumption of a device.

The following separately describes the data transmission method in this embodiment of this application from perspectives of early uplink data transmission and early downlink data transmission with reference to FIG. 15 to FIG. 18. It should be understood that, for steps, terms, concepts, and the like that are shown in FIG. 15 to FIG. 18 and that are the same as or correspond to those in FIG. 2, reference may be made to the foregoing descriptions of FIG. 2. To avoid repetition, when FIG. 15 to FIG. 18 are described, same or corresponding content is not described in detail again.

Without loss of generality, the following describes the embodiments of this application by using a message 3 as an example of RRC signaling #1 and using a message 4 as an example of RRC signaling #2.

FIG. 15 is a schematic flowchart of a data transmission method according to an embodiment of this application. The method shown in FIG. 15 is applicable to early uplink data transmission based on a CP scheme.

S1510. A terminal device sends a message 1 to an access network device.

The message 1 is used to indicate that the terminal device is to transmit data in a manner of early uplink data transmission and/or early downlink data transmission.

S1520. After receiving the message 1, the access network device sends a message 2 to the terminal device.

Optionally, in this embodiment of this application, if the access network device learns, based on the message 1, that the UE expects to perform early uplink data transmission, the access network device allocates, to the terminal device, a resource used for transmitting uplink data.

Further, a size of the resource used for transmitting the uplink data may be fixed, for example, 100 bytes. Alternatively, the size of the resource used for transmitting the uplink data may be determined by the access network device depending on a first message (for example, a resource for sending the first message or a preamble in the first message). In other words, the first message, for example, the resource for sending the first message or the preamble in the first message, may be further used to indicate a size of the uplink data, so that the access network device can properly allocate, based on the size of the uplink data, the resource used for transmitting the uplink data.

S1530. The terminal device sends a message 3 to the access network device.

For example, the message 3 may carry the uplink data.

For example, after the message 2 is received, if the uplink data needs to be transmitted, the terminal device may transmit, while transmitting the message 3, the uplink data on a preconfigured or reserved resource used for early uplink data transmission.

For another example, the terminal device may transmit the message 3 and the uplink data on a target resource indicated by the message 2.

A definition of the message 3 is the same as that in the foregoing embodiments. A specific message name is not limited.

S1540. The access network device sends a candidate message #1 to an MME.

The candidate message #1 includes the uplink data. For example, the candidate message #1 may be a retrieve UE information message, an initial UE message, or another newly-defined message. This is not limited in this embodiment of this application.

In this case, the MME can obtain the uplink data of the terminal device, thereby implementing early uplink data transmission.

Optionally, the method may further include the following step:

S1560. The access network device sends a candidate message #3 to the terminal device.

Optionally, the candidate message #3 may be a message 4.

In addition, the candidate message #3 may alternatively be a newly-defined $1^{st}$ RRC message sent by the access network device to the terminal device. This is not limited in this embodiment of this application.

Optionally, the candidate message #3 may carry indication information (for example, denoted as indication information #2). The indication information #2 is used to indicate that a current procedure or session process can be ended, or indicate that the terminal device needs to return to or remain in an idle mode. The indication information #2 may be represented as an end indication or a release indication.

Optionally, after receiving the message 4, the terminal device sends a message 5 to the access network device. For example, the message 5 may be an RRC connection complete message, an RRC connection reestablishment complete message, or an RRC connection resume complete message.

In a possible implementation, the message 5 does not carry a NAS message. In this case, if the access network device needs to transmit downlink data, after receiving the message 5, the access network device sends the downlink data to the terminal device, and instructs the terminal device to return to the idle mode or remain in the idle mode.

In another possible implementation, after receiving the message 4 (for example, a contention resolution message, an RRC connection setup message, an RRC connection reestablishment message, or RRC connection resume message), the terminal device establishes an RRC connection according to a normal RRC connection setup process. In this case, if the terminal device has no uplink data, the terminal device may send a null NAS message (for example, denoted as a NAS message #1), for example, ESM Data Transport, in the message 5 (for example, RRC connection setup complete, RRC connection reestablishment complete, or RRC connection resume complete). The NAS message #1 has only a message header, but has no data unit. After receiving the NAS message #1, the access network device sends the NAS message #1 to the MME by using an initial UE message or another message. After receiving the message, the MME may ignore or discard the NAS message. A subsequent process is the same as that in the prior art. For brevity, details are not described herein.

In still another possible implementation, the terminal device may send, in the message 5 (for example, RRC connection setup complete, RRC connection reestablishment complete, or RRC connection resume complete), a NAS message (for example, denoted as a NAS message #2) that is the same as a NAS message in the message 3, for example, a control plane service request (Control Plane Service Request (ESM Data Transport)) message. Further, the NAS message #2 may include indication information (for example, denoted as indication information #3), where the indication information #3 is used to indicate that the NAS message #2 is the same as the NAS message transmitted in the message 3. After receiving the NAS message #2, the access network device sends the NAS message to the MME, and the MME may ignore the message based on the indication information.

In yet another possible implementation, the UE may send a NAS message (for example, denoted as a NAS message #3) in the message 5 (for example, RRC connection setup complete, RRC connection reestablishment complete, or RRC connection resume complete). The NAS message #3 may include indication information (for example, denoted as indication information #4). The indication information #4 is used to distinguish between the NAS message #3 and a NAS message in a message 5 in the prior art, to help the MME perform subsequent processing. The MME may ignore or discard the NAS message after receiving the indication information #4. Alternatively, the NAS message and the indication information are two fields. Therefore, the NAS message #3 may carry the indication information, or the NAS message #3 and the indication information may be different fields. An application scenario of the NAS message #3 is as follows: The NAS message #3 is used only when the uplink data has been transmitted by using RRC signaling #1 and there is no other uplink NAS data in the message 5. The terminal device has sent the NAS message in the message 3. Therefore, in the foregoing implementations, a problem that NAS messages are mandatory in the existing message 5 and an initial UE message can be overcome.

The foregoing implementations may be used to transmit data when there is one downlink packet but the access network device cannot transmit the downlink packet, or when a core network device has a plurality of downlink packets.

In this way, when the MME has no downlink data transmission, the terminal device can be released in advance according to the indication information #2 in the candidate message #3, or the terminal is instructed to remain in the idle mode according to the indication information #2 in the candidate message #3. Compared with a release procedure in the prior art, this can reduce signaling overheads, and can reduce power consumption of the terminal device.

Further, if the candidate message #3 is an RRC connection setup message, an RRC connection reestablishment message, or an RRC connection resume message, the candidate message #3 may include a redirection indication and the like.

If the candidate message #3 is an RRC connection reject message, the candidate message #3 may further carry indication information. The indication information is used to instruct the terminal to return to or remain in the idle mode.

Optionally, the candidate message #3 may carry the downlink data.

Further, the downlink data may be encapsulated in a NAS PDU. In other words, the candidate message #3 may carry the NAS PDU including the downlink data. The NAS PDU may be carried on an SRB0.

The downlink data may be sent by the MME to the access network device by using a paging message, or may be sent by the MME to the access network device by using a candidate message #2.

In addition, the downlink data may be alternatively sent by the MME to the access network device through downlink NAS transport between the MME and the access network device after the MME sends the candidate message #2 and before the access network device sends the candidate message #3.

For example, the access network device may notify in advance the MME of a size of a data packet that can be scheduled by the access network device. For example, the access network device indicates, by using the candidate message #1, the size of the data packet that can be scheduled by the access network device. The MME may split the downlink data into packets, and send the packets to the access network device. In this case, the access network device may continuously send a plurality of data packets to the terminal device; each data packet carries identifier information of the terminal device; and after sending the last data packet, the access network device may send the indication information #2 to the terminal, to release the terminal device or instruct the terminal to return to or remain in the idle mode.

Optionally, if the downlink data is sent by the MME to the access network device by using the candidate message #2, before S1560, the method further includes the following step:

S1550. The MME sends the candidate message #2 to the access network device, where the candidate message #2 includes the downlink data.

For example, the candidate message #2 may be a UE information transfer message, a downlink NAS transport message, or a newly-defined message. This is not limited in this embodiment of this application.

Optionally, the candidate message #2 may further include indication information (for example, denoted as indication information #1). The indication information #1 is used to indicate that a current procedure or session process can be ended, or indicate that the terminal device needs to return to or remain in the idle mode. The indication information #1 may be represented as an end indication.

For example, when the MME sends the candidate message #2 to the access network device, if there is no downlink data, the MME may add indication information to the message. The indication information is used to indicate that the procedure ends, or instruct the access network device to instruct the terminal device to return to the idle mode or remain in the idle mode.

For example, when the MME sends the candidate message #2 to the access network device, if there is downlink data and there is only one data packet, the MME adds indication information to the message. The indication information is used to indicate that the procedure ends, or instruct the access network device to instruct the terminal device to return to the idle mode or remain in the idle mode.

For example, if downlink packets of a plurality of terminals arrive at the MME, the MME does not add the indication information to the candidate message #2 when sending the candidate message #2 to the access network device. It should be understood that, in this case, the terminal device has not entered a connected mode, and is in the idle mode or an intermediate mode between the idle mode and the connected mode; or a status of the terminal is that an air interface has not entered a connected mode and an Si interface has entered a connected mode.

Therefore, the MME may instruct, by sending the indication information #1, the access network device to instruct the terminal device to return to or remain in the idle mode. It should be further understood that the indication information #2 may be the same as or different from the indication information #1. This is not limited in this embodiment of this application.

Further, after sending the downlink data to the terminal device, the access network device may send an acknowledgement (ACK) to the MME, for example, sending a NAS deliver ACK. The ACK is used to indicate that the access network device has sent the downlink data to the terminal device, and the MME does not need to send a paging message to the access network device.

Optionally, in S1560, if the access network device does not send the downlink data to the terminal device, the access network device may feed back, to the MME, that data is not successfully sent, or send, to the MME, the data that has not been sent. The MME may use a paging manner, so that the terminal device obtains the data.

Therefore, according to the data transmission method in this embodiment of this application, the uplink data can be transmitted based on $1^{st}$ RRC signaling sent by the terminal device to the access network device, without a need of establishing an RRC connection. This can reduce power consumption and signaling overheads.

Figure 16:
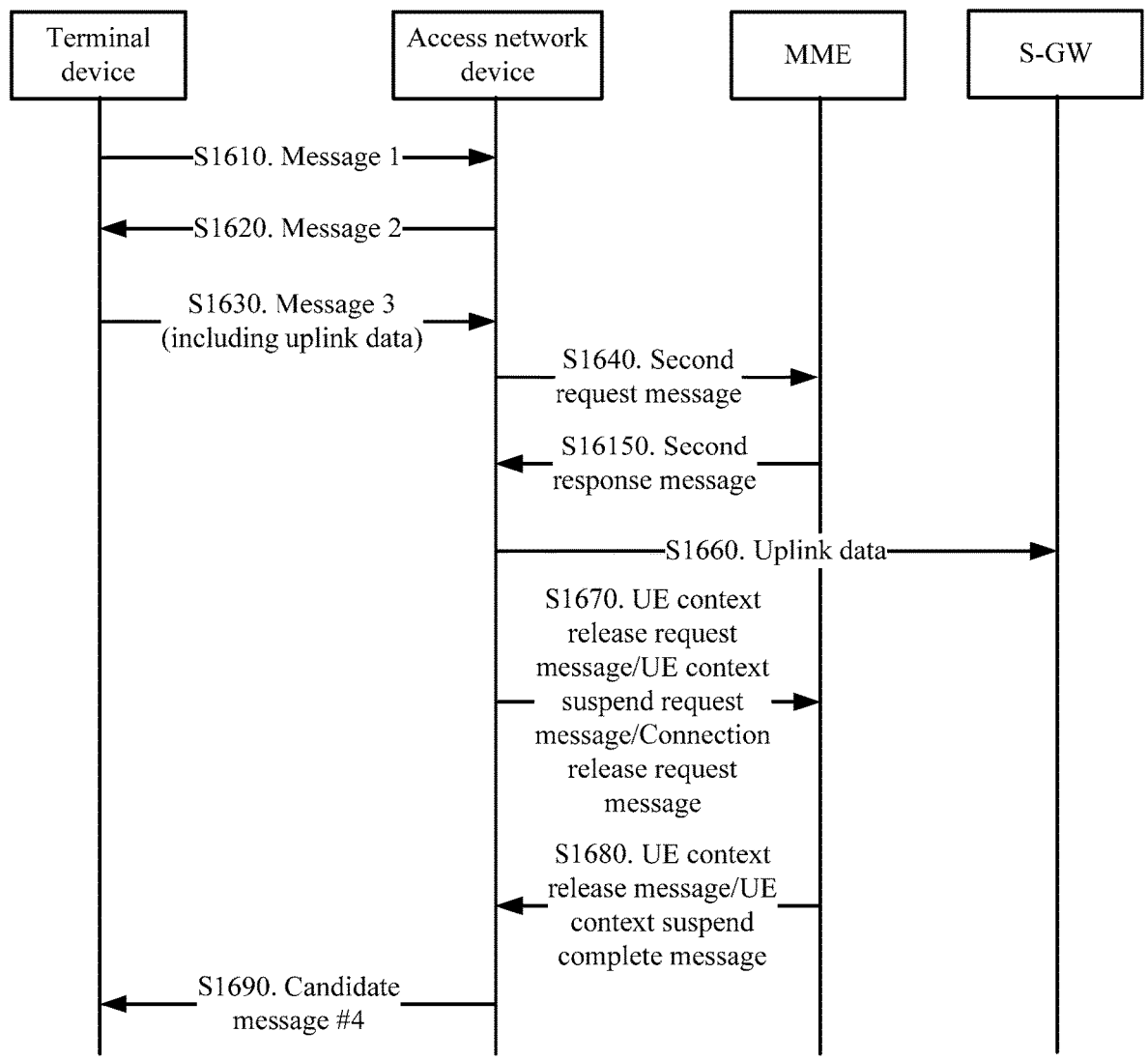
FIG. 16 is a schematic flowchart of another method for early uplink data transmission based on a UP scheme according to this application.

FIG. 16 is a schematic flowchart of a data transmission method according to an embodiment of this application. The method shown in FIG. 16 is applicable to early uplink data transmission based on a UP scheme. It should be understood that, for terms, concepts, and the like that appear in the following and that are the same as or correspond to those in FIG. 16, reference may be made to the foregoing descriptions of FIG. 15. To avoid repetition, details are not described again in the following.

S1610. A terminal device sends a message 1 to an access network device.

S1620. After receiving the message 1, the access network device sends a message 2 to the terminal device.

S1630. The terminal device sends a message 3 to the access network device.

The message 3 includes uplink data, and the uplink data may be sent by using a data radio bearer DRB. The uplink data needs to be encrypted. A key may be updated by obtaining a next hop chaining count (NCC) in a previous connection.

Further, a DRB used by the terminal device to send data may be configured based on a DRB in a previous connection, or may be configured by using a default DRB. If the DRB is configured by using the DRB in the previous connection and the access network device does not support the configuration, the access network device re-configures the terminal device, for example, configures the terminal device by using an RRC reconfiguration message or an RRC connection resume message.

Further, the method may further include the following step:

S1640. The access network device sends a second request message to an MME.

Optionally, content in the second request message may be the same as content in a UE context resume request message.

Further, the second request message may be the UE context resume request message.

After receiving the message 3, the access network device verifies the terminal device based on a short message authentication code for integrity (short-MAC-I). If the access network device is not an original access network device, the short-MAC-I needs to be sent to a source access network device through an X2 interface. The source access network device performs verification, and after the verification succeeds, sends context information of the terminal device to the current access network device. The current access network device performs a subsequent operation.

Further, the method may further include the following steps.

S1650. The MME sends a second response message to the access network device based on the second request message.

Optionally, content in the second response message may be the same as content in a UE context resume response message.

Further, the second response message is the UE context resume response message.

If the access network device finds, based on the received second response message, that a radio access bearer (E-UTRAN Radio Access Bearer, E-RAB) corresponding to data received by the access network device is rejected, the access network device sends an RRC connection resume message or an RRC connection setup message to the terminal device. The RRC connection resume message or the RRC connection setup message may include indication information. The indication information is used to indicate that data transmission on the E-RAB is rejected or fails, or indicate that the terminal device needs to re-send a previously sent data packet. In this case, the access network device allocates an additional UL grant for the data transmission.

S1660. After receiving the second response message, the access network device sends the uplink data to the S-GW.

In this case, the S-GW can obtain the uplink data of the terminal device, thereby implementing early uplink data transmission.

Optionally, the method may further include the following steps:

S1670. After successfully sending the uplink data, the access network device may send a UE context release request message, a UE context suspend request message, or a connection release request message to the MME.

S1680. The MME sends a UE context release message to the access network device based on the UE context release request message, the MME sends a UE context suspend complete message to the access network device based on the UE context suspend request message, or the MME sends a UE context release message to the access network device based on the connection release request.

S1690. The access network device sends a candidate message #4 to the terminal device.

Optionally, the candidate message #4 may be a message 4, for example, an RRC connection setup message, an RRC connection reestablishment message, or an RRC connection resume message; or may be an RRC connection release message.

In addition, the candidate message #4 may alternatively be a newly-defined $1^{st}$ RRC message sent by the access network device to the terminal device. This is not limited in this embodiment of this application.

It should be understood that the candidate message #4 may be the same as or different from a candidate message #3. This is not limited in this embodiment of this application.

Optionally, the candidate message #4 may carry indication information (for example, denoted as indication information #5). The indication information #5 is used to indicate that a current procedure or session process can be ended, or indicate that the terminal device needs to return to or remain in an idle mode. The indication information #5 may be represented as an end indication.

It should be understood that the indication information #5 may be the same as or different from indication information #2. This is not limited in this embodiment of this application.

In this way, when the S-GW has no downlink data transmission, the terminal device can be released in advance according to the indication information #5 in the candidate message #4. Compared with a release procedure in the prior art, this can reduce signaling overheads, and can reduce power consumption of the terminal device.

Further, if the candidate message #4 is an RRC connection setup message, an RRC connection reestablishment message, or an RRC connection resume message, the candidate message #4 may include a redirection indication and the like.

Optionally, the candidate message #4 may carry downlink data.

If the downlink data has arrived at the access network device but the access network device cannot send the downlink data to the terminal device, transmission is performed in a manner similar to the several manners in S1560, for example, in a manner in which an RRC connection is established and a null NAS message or indication information is placed in a message 5, and then a normal data transmission procedure is used.

Therefore, according to the data transmission method in this embodiment of this application, the uplink data can be transmitted based on $1^{st}$ RRC signaling sent by the terminal device to the access network device, without a need of establishing the RRC connection. This can reduce power consumption and signaling overheads.

Figure 17:
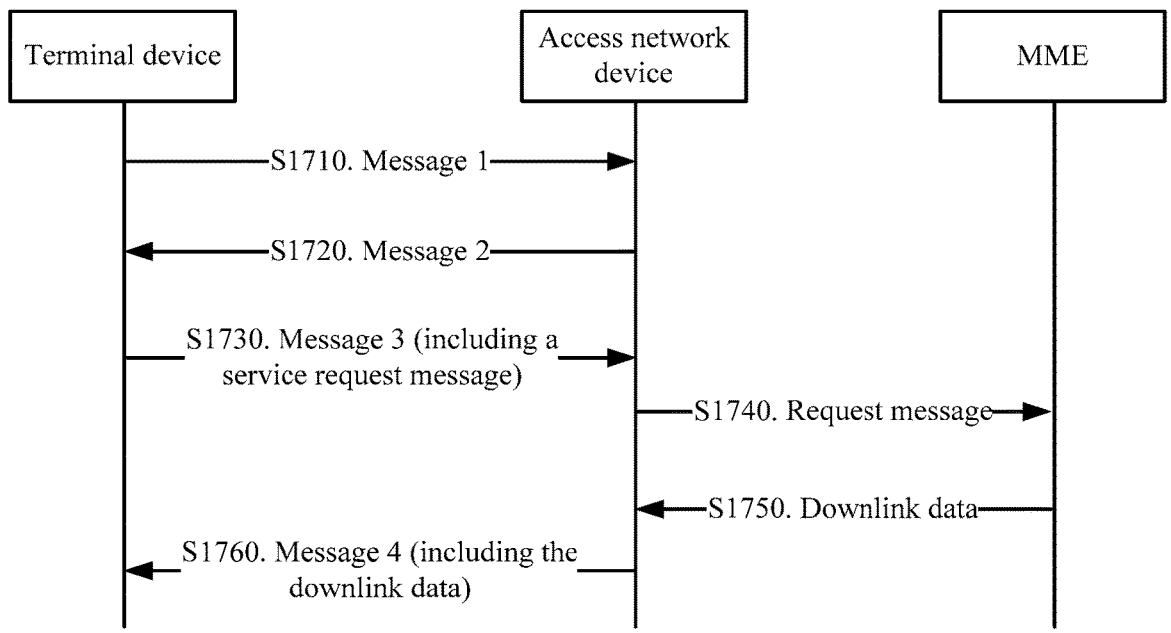
FIG. 17 is a schematic flowchart of another method for early downlink data transmission based on a CP scheme according to this application.

FIG. 17 is a schematic flowchart of a data transmission method according to another embodiment of this application. The method shown in FIG. 17 is applicable to early downlink data transmission based on a CP scheme.

S1710. A terminal device sends a message 1 to an access network device.

S1720. After receiving the message 1, the access network device sends a message 2 to the terminal device.

S1730. The terminal device sends a message 3 to the access network device, where the message 3 may include a service request message.

As described in the foregoing embodiments, the message 3 may be existing RRC signaling or newly-defined RRC signaling.

Indication information (for example, denoted as indication information #6) in the message 3 may be used to indicate that the terminal device is to perform early downlink data transmission. In other words, downlink data is to be transmitted based on $1^{st}$ RRC signaling sent by the access network device to the terminal device. After receiving the indication information #6, the access network device may trigger signaling interaction with a core network device relatively early.

S1740. After receiving the message 3, the access network device sends a request message to an MME.

The request message may be a retrieve UE information message, an initial UE message, or another newly-defined message. This is not limited in this embodiment of this application.

S1750. After receiving the request message, the MME sends the downlink data to the access network device.

Optionally, the MME may send the downlink data to the access network device by using a UE information transfer message or a downlink NAS transport message.

S1760. The access network device sends the downlink data to the terminal device by using a message 4.

Further, the message 4 is used to instruct the terminal device to remain in an idle mode or return to the idle mode. The terminal device returns to the idle mode or remains in the idle mode based on the message 4.

Therefore, according to the data transmission method in this embodiment of this application, the downlink data can be transmitted by using the message 4. In other words, early downlink data transmission can be implemented, so that power consumption and signaling overheads can be reduced.

Figure 18:
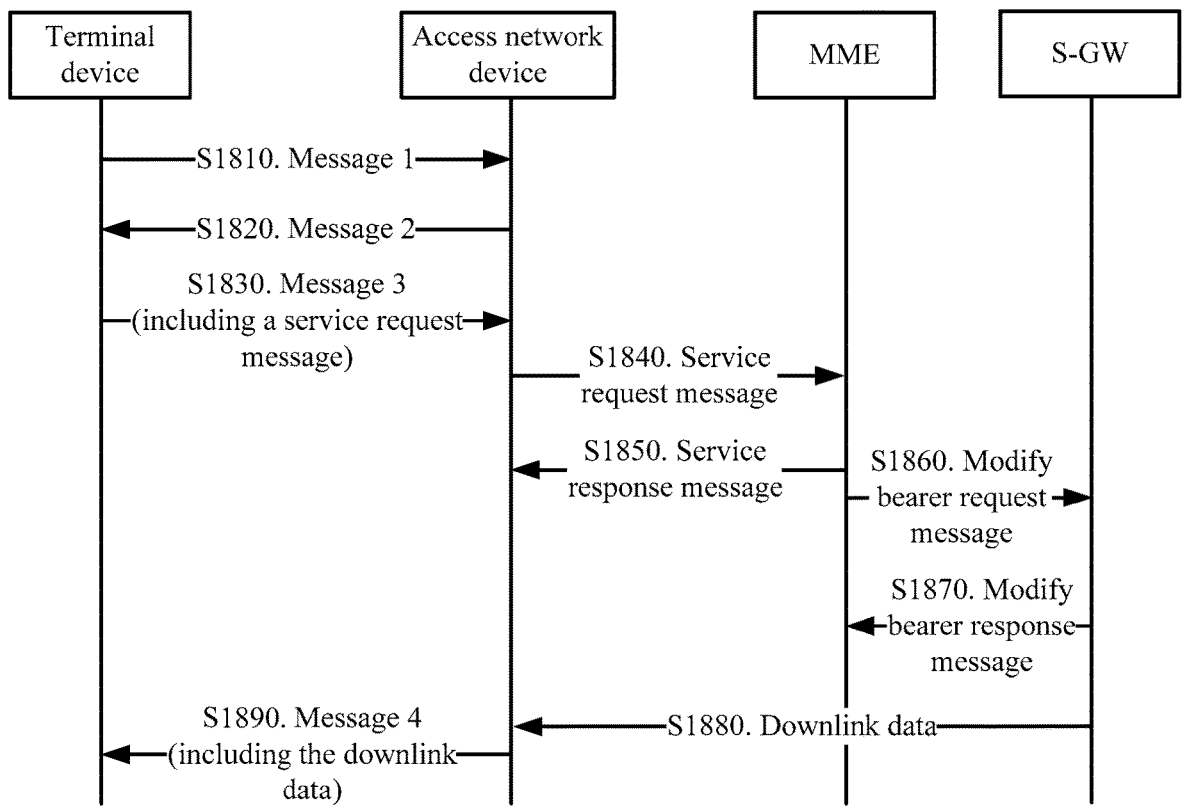
FIG. 18 is a schematic flowchart of another method for early downlink data transmission based on a UP scheme according to this application.

FIG. 18 is a schematic flowchart of a data transmission method according to another embodiment of this application. The method shown in FIG. 18 is applicable to early downlink data transmission based on a UP scheme.

S1810. A terminal device sends a message 1 to an access network device.

S1820. After receiving the message 1, the access network device sends a message 2 to the terminal device.

S1830. The terminal device sends a message 3 to the access network device based on the message 2, where the message 3 may include a service request message.

S1840. After receiving the service request message in the message 3, the access network device sends the service request message to an MME.

Optionally, the access network device may send the service request message to the MME by using a terminal device context resume request message.

S1850. The MME sends a service response message to the access network device based on the service request message.

Optionally, after receiving the terminal device context resume request message sent by the access network device, the MME may send a terminal device context resume response message to the access network device.

S1860. The MME sends a modify bearer request message to an S-GW.

S1870. The S-GW returns a modify bearer response message to the MME, so that the S-GW can obtain an address of the access network device.

S1880. The S-GW sends the downlink data to the access network device.

S1890. The access network device sends the downlink data to the terminal device by using a message 4.

Optionally, before S1890, after the access network device receives the downlink data sent by the S-GW, the method may further include:

sending, by the access network device, a UE context release request message, a UE context suspend request message, a connection release request message, or another release request message to the MME;

sending, by the MME, a UE context release command message to the access network device based on the UE context release request message, sending, by the MME, a UE context suspend complete message to the access network device based on the UE context suspend request message, or sending, by the MME, a UE context release message to the access network device based on the connection release request; and sending, by the access network device, a candidate message #5 to the terminal device based on the UE context release command message or the UE context suspend complete message.

Optionally, the candidate message #5 may be the message 4.

For example, the message 4 may be an RRC connection setup message, an RRC connection reestablishment message, an RRC connection resume message, or an RRC connection release message.

In addition, the candidate message #5 may alternatively be a newly-defined $1^{st}$ RRC message sent by the access network device to the terminal device. This is not limited in this embodiment of this application.

It should be understood that the candidate message #5 may be the same as or different from a candidate message #3. This is not limited in this embodiment of this application.

Optionally, the candidate message #5 may carry indication information (for example, denoted as indication information #6). The indication information #6 is used to indicate that a current procedure or session process can be ended, or indicate that the terminal device needs to return to or remain in an idle mode. The indication information #6 may be represented as an end indication.

It should be understood that the indication information #6 may be the same as or different from indication information #2. This is not limited in this embodiment of this application.

In this way, when the S-GW has no downlink data transmission, the terminal device can be released in advance according to the indication information #6 in the candidate message #5. Compared with a release procedure in the prior art, this can reduce signaling overheads, and can reduce power consumption of the terminal device.

Further, if the candidate message #5 is the RRC connection setup message, the RRC connection reestablishment message, or the RRC connection resume message, the candidate message #5 may also include related information in the RRC connection release message, for example, a release cause or a redirection indication.

If the candidate message #5 is an RRC connection reject message, the candidate message #5 may also carry a cause value. The cause value indicates a cause why an RRC connection is rejected.

If the candidate message #5 is the RRC connection release message, the terminal is instructed to return to or remain in the idle mode. The candidate message #5 may carry identifier information of the terminal device. Specifically, the identifier information of the terminal device may be carried in a MAC CE, or may be scrambled by using a PDCCH.

Optionally, in S1890, the access network device may send the downlink data to the terminal device by using the candidate message #5.

Therefore, according to the data transmission method in this embodiment of this application, the uplink data can be transmitted based on $1^{st}$ RRC signaling sent by the terminal device to the access network device, without a need of establishing an RRC connection. This can reduce power consumption and signaling overheads.

Optionally, in a possible implementation, when the terminal device receives a paging message, the paging message may include indication information, to indicate that the access network device needs to perform an operation of early downlink data transmission. In this way, the terminal device may perform a subsequent procedure based on the operation of early downlink data transmission. Further, a core network device may add indication information to a paging message to be sent to the access network device, to indicate that the access network device needs to perform early downlink data transmission. Before sending the paging message to the terminal, the access network device receives a downlink packet and/or indication information from a core network device. The indication information is used to indicate that a downlink data packet may be sent to the terminal in a manner of early data transmission (for example, early downlink data transmission).

Optionally, when the terminal device is in a connected mode, the access network device may also send an indication to the terminal device by using a PDCCH, to indicate that the UE needs to perform random access in a manner of early data transmission, for example, early uplink data transmission or early downlink data transmission, that is, perform random access by using a PDCCH order. Specific indication information may be carried in DCI. Alternatively, a location of a resource that is accessed by the UE and that is indicated by the access network device is a location of a resource used for early data transmission, to implement early data transmission. In this way, in the connected mode, the access network device can instruct, by using the PDCCH, the UE to perform early data transmission.

Figure 19:
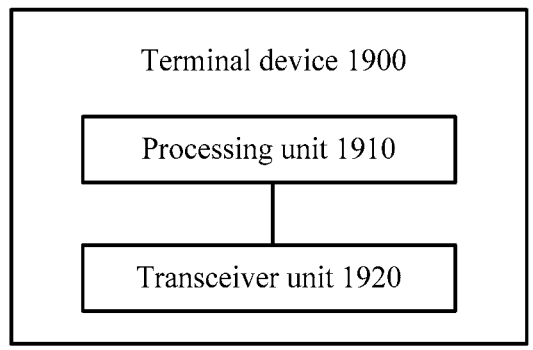
FIG. 19 is a schematic block diagram of another terminal device according to this application.

FIG. 19 is a schematic block diagram of a terminal device 1900 according to an embodiment of this application. As shown in FIG. 19, the terminal device 1900 includes a processing unit 1910 and a transceiver unit 1920.

The processing unit 1910 is configured to generate a first indication, where the first indication is used to indicate that the terminal device is to transmit data based on $1^{st}$ radio resource control RRC signaling to be sent by the terminal device to an access network device, and/or the first indication is used to indicate that the access network device is to transmit data based on $1^{st}$ radio resource control RRC signaling to be sent by the access network device to the terminal device.

The transceiver unit 1920 is configured to: send, to the access network device, the first indication generated by the processing unit, and transmit the data between the terminal device and the access network device based on the $1^{st}$ RRC signaling.

It should be understood that the processing unit 1910 may be implemented by a processor, and the transceiver unit 1920 may be implemented by a transceiver.

It should be further understood that the terminal device 1900 may correspond to the terminal device described in the foregoing methods, and the modules or units in the terminal device 1900 are configured to perform the actions or the processing processes performed by the terminal device in the method embodiments shown in FIG. 10 to FIG. 18. Herein, to avoid repetition, detailed descriptions thereof are omitted.

Figure 20:
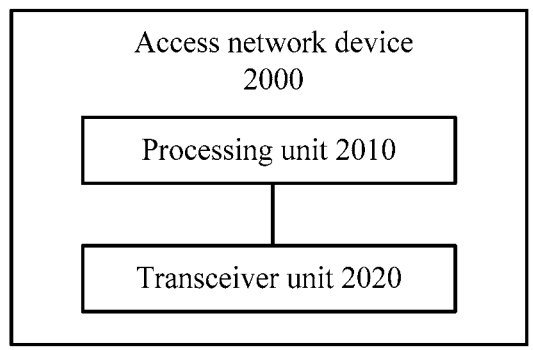
FIG. 20 is a schematic block diagram of another access network device according to this application.

FIG. 20 is a schematic block diagram of an access network device 2000 according to an embodiment of this application. As shown in FIG. 20, the access network device 2000 includes a processing unit 2010 and a transceiver unit 2020.

The processing unit 2010 is configured to control the transceiver unit 2020 to:

receive a first indication sent by a terminal device, where the first indication is used to indicate that the terminal device is to transmit data based on $1^{st}$ radio resource control RRC signaling to be sent by the terminal device to the access network device, and/or the first indication is used to indicate that the access network device is to transmit data based on $1^{st}$ radio resource control RRC signaling to be sent by the access network device to the terminal device; and transmit the data between the access network device and the terminal device based on the $1^{st}$ RRC signaling.

It should be understood that the processing unit 2010 may be implemented by a processor, and the transceiver unit 2020 may be implemented by a transceiver.

It should be further understood that the access network device 2000 may correspond to the access network device described in the foregoing methods, and the modules or units in the access network device 2000 are configured to perform the actions or the processing processes performed by the access network device in the method embodiments shown in FIG. 10 to FIG. 18. Herein, to avoid repetition, detailed descriptions thereof are omitted.

The embodiments of this application may be applied to a processor, or implemented by a processor. The processor may be an integrated circuit chip and has a signal processing capability. In an implementation process, steps in the foregoing method embodiments may be implemented by using a hardware integrated logic circuit in the processor, or by using an instruction in a form of software. The processor may be a central processing unit (CPU). Alternatively, the processor may be another general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. The steps in the methods disclosed with reference to the embodiments of this application may be directly performed and accomplished by using a hardware decoding processor, or may be performed and accomplished by using a combination of hardware in a decoding processor and a software unit. The software unit may be located in a mature storage medium in the field, for example, a random access memory, a flash memory, a read-only memory, a programmable read-only memory, an electrically erasable programmable memory, or a register. The storage medium is located in a memory, and the processor reads information in the memory and performs the steps in the foregoing methods by using hardware of the processor.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By using an example that is not construed as a limitation for description, many forms of RAMs may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memory in the system and methods that are described in this specification includes but is not limited to these and any other proper types of memories.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in various embodiments of this application, sequence numbers of the foregoing processes do not mean execution sequences. The execution sequences of the processes should be determined based on functions and internal logic of the processes, and should not be construed as any limitation on the implementation processes of the embodiments of this application.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for convenience and brevity of description, for detailed working processes of the foregoing system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division during actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, and may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for enabling a computer device (which may be a personal computer, a server, a network device, or the like) to perform all or some of the steps in the methods described in the embodiments of this application. The storage medium includes various media that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   receiving, by a terminal device, system information, wherein the system information is used to indicate a capability of early data transmission is supported;
   sending, by the terminal device, a first indication to an access network device, wherein the first indication indicates early data transmission; and
   performing, by the terminal device, the early data transmission between the terminal device and the access network device;
   wherein in response to the early data transmission being indicated for early uplink data transmission, the performing, by the terminal device, the early data transmission between the terminal device and the access network device comprises:
      performing, by the terminal device, the early uplink data transmission by using a first radio resource control (RRC) signaling after the first indication, wherein the first RRC signaling is a message 3 (Msg 3); and
   wherein in response to the early data transmission being indicated for early downlink data transmission, the performing, by the terminal device, the early data transmission between the terminal device and the access network device comprises:
      sending, by the terminal device, a service request message to the access network device by using the Msg 3, and
      receiving, by the terminal device, downlink data from the access network device in response to the service request message by using a message 4 (Msg 4).

2. The method according to claim 1, wherein the sending, by the terminal device, the first indication to the access network device comprises:
   sending, by the terminal device, a random access request message using a first time frequency code resource or a second time frequency code resource, wherein the first time frequency code resource indicates the early uplink data transmission, and the second time frequency code resource indicates the early downlink data transmission.

3. The method according to claim 1, wherein the performing, by the terminal device, the early uplink data transmission between the terminal device and the access network device comprises:
   transmitting data between the terminal device and the access network device using a non-access-stratum protocol data unit (NAS PDU); or
   transmitting data between the terminal device and the access network device by using a data radio bearer (DRB).

4. The method according to claim 1, further comprising:
   receiving, by the terminal device, a release message from the access network device, where the release message is an RRC connection setup message, an RRC connection resume message, an RRC connection reestablishment complete message, an RRC connection reject message, or an RRC connection message, and the release message is used to release the terminal device to an idle mode.

5. The method according to claim 1, further comprising:
   receiving, by the terminal device, a release message from the access network device, wherein the release message carries data to be transmitted.

6. The method according to claim 1, further comprising:
   transmitting, by the terminal device, data between the terminal device and the access network device using a data radio bearer (DRB), wherein the data is transmitted using a key updated by obtaining a next hop chaining count (NCC) in a previous connection, and wherein the data is encrypted.

7. An apparatus for data transmission, the apparatus comprising:
   a receiver, configured to receive system information, wherein the system information is used to indicate a capability of early data transmission is supported;
   a transmitter, configured to send a first indication to an access network device, wherein the first indication indicates early data transmission; and
   a processor, configured to cause the transmitter to perform the early data transmission between the apparatus and the access network device;
   wherein in response to the early data transmission being indicated for early uplink data transmission, the performing the early data transmission between the apparatus and the access network device comprises:
      performing the early uplink data transmission by using a first radio resource control (RRC) signaling after the first indication, wherein the first RRC signaling is a message 3 (Msg 3); and
   wherein in response to the early data transmission being indicated for early downlink data transmission, the performing the early data transmission between the apparatus and the access network device comprises:
      sending, by the transmitter, a service request message to the access network device by using the Msg 3, and
      receiving, by the receiver, downlink data from the access network device in response to the service request message by using a message 4 (Msg 4).

8. The apparatus according to claim 7, wherein the transmitter is configured to:
   send a random access request message using a first time frequency code resource or a second time frequency code resource, wherein the first time frequency code resource indicates the early uplink data transmission, and the second time frequency code resource indicates the early downlink data transmission.

9. The apparatus according to claim 7, wherein the transmitter is configured to:
   transmit data between the apparatus and the access network device using a non-access-stratum protocol data unit (NAS PDU); or
   transmit data between the apparatus and the access network device using a data radio bearer (DRB).

10. The apparatus according to claim 7,
wherein the receiver is further configured to receive a release message from the access network device, wherein the release message is an RRC connection setup message, an RRC connection resume message, an RRC connection reestablishment complete message, an RRC connection reject message, or an RRC connection release message, and the release message is used to release the apparatus to an idle mode.

11. The apparatus according to claim 7,
wherein the receiver is further configured to receive a release message from the access network device, wherein the release message carries data to be transmitted.

12. The apparatus according to claim 7, wherein the transmitter is configured to:
transmit data between the apparatus and the access network device using a data radio bearer (DRB), wherein the data is transmitted using a key updated by obtaining a next hop chaining count (NCC) in a previous connection, and wherein the data is encrypted.

13. A non-transitory computer readable medium storing program codes for use by a user equipment (UE) for data transmission, wherein the program codes comprise instructions for:
receiving system information, wherein the system information is used to indicate a capability of early data transmission is supported;
sending a first indication to an access network device, wherein the first indication indicates early data transmission; and
performing the early data transmission between the UE and the access network device;
wherein in response to the early data transmission being indicated for early uplink data transmission, the performing the early data transmission between the apparatus and the access network device comprises:
performing the early uplink data transmission by using a first radio resource control (RRC) signaling after the first indication, wherein the first RRC signaling is a message 3 (Msg 3); and
wherein in response to the early data transmission being indicated for early downlink data transmission, the performing the early data transmission between the apparatus and the access network device comprises:
sending, by the transmitter, a service request message to the access network device by using the Msg 3, and
receiving, by the receiver, downlink data from the access network device in response to the service request message by using a message 4 (Msg 4).

14. The non-transitory computer readable medium according to claim 13, wherein the sending the first indication to the access network device comprises:
sending a random access request message using a first time frequency code resource or a second time frequency code resource, wherein the first time frequency code resource indicates the early uplink data transmission, and the second time frequency code resource indicates the early downlink data transmission.

15. The non-transitory computer readable medium according to claim 13, wherein the performing the early uplink data transmission between the UE and the access network device comprises:
transmitting data between the UE and the access network device using a non-access-stratum protocol data unit (NAS PDU); or
transmitting data between the UE and the access network device using a data radio bearer (DRB).

16. The non-transitory computer readable medium according to claim 13, wherein the program codes further comprise instructions for:
receiving a release message from the access network device, wherein the release message is an RRC connection setup message, an RRC connection resume message, an RRC connection reestablishment complete message, an RRC connection reject message, or an RRC connection release message, and the release message is used to release the UE to an idle mode.

17. The non-transitory computer readable medium according to claim 13, wherein the program codes further comprise instructions for:
receiving a release message from the access network device, wherein the release message carries data to be transmitted.

* * * * *